US012620573B2

(12) United States Patent
Lee et al.

(10) Patent No.: US 12,620,573 B2
(45) Date of Patent: May 5, 2026

(54) ELECTRODE INCLUDING ELECTRODE ACTIVE MATERIAL HAVING THROUGH-HOLES, LITHIUM BATTERY CONTAINING THE SAME, AND METHOD OF PREPARING THE SAME

(71) Applicant: Samsung SDI Co., Ltd., Yongin-si (KR)

(72) Inventors: Donggeun Lee, Yongin-si (KR); Ilkyong Kwon, Yongin-si (KR); Hyun Nam, Yongin-si (KR); Jinhyon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 846 days.

(21) Appl. No.: 17/815,918

(22) Filed: Jul. 28, 2022

(65) Prior Publication Data

US 2023/0085771 A1 Mar. 23, 2023

(30) Foreign Application Priority Data

Jul. 28, 2021 (KR) ........................ 10-2021-0099439

(51) Int. Cl.
H01M 4/13 (2010.01)
H01M 4/02 (2006.01)
(Continued)

(52) U.S. Cl.
CPC ........... H01M 4/13 (2013.01); H01M 4/0404 (2013.01); H01M 4/0409 (2013.01);
(Continued)

(58) Field of Classification Search
CPC .... H01M 4/13; H01M 4/0404; H01M 4/0409; H01M 4/0435; H01M 4/622;
(Continued)

(56) References Cited

U.S. PATENT DOCUMENTS 11,081,762 B2 8/2021 Song et al.
2009/0002577 A1 1/2009 Watanabe et al.
(Continued)

FOREIGN PATENT DOCUMENTS

CN 111244392 A 6/2020
EP 2058890 A2 5/2009
(Continued)

OTHER PUBLICATIONS

Extended European Search Report for Application No. 22187605.5, mailed Feb. 9, 2023, 9 pages.
(Continued)

*Primary Examiner* — Maria Laios
*Assistant Examiner* — Lawrence La Raia, III
(74) *Attorney, Agent, or Firm* — Womble Bond Dickinson (US) LLP

(57) ABSTRACT

An electrode, a lithium battery including the same, and a method of preparing the electrode are provided. The electrode includes an electrode active material layer including an electrode active material and a binder; and an electrode current collector at a portion of the electrode active material layer and at one side of the electrode active material layer, or at a portion of the electrode active material layer between opposing sides of the electrode active material layer, wherein the electrode active material layer includes a plurality of through-holes.

19 Claims, 19 Drawing Sheets

(51) Int. Cl.

| | | |
|---|---|---|
| *H01M 4/04* | (2006.01) | |
| *H01M 4/139* | (2010.01) | |
| *H01M 4/62* | (2006.01) | |
| *H01M 4/66* | (2006.01) | |
| *H01M 4/70* | (2006.01) | |
| *H01M 10/052* | (2010.01) | |
| *H01M 10/0525* | (2010.01) | |

(52) U.S. Cl.
CPC ....... *H01M 4/0435* (2013.01); *H01M 4/0469* (2013.01); *H01M 4/139* (2013.01); *H01M 4/622* (2013.01); *H01M 4/623* (2013.01); *H01M 4/625* (2013.01); *H01M 4/661* (2013.01); *H01M 4/663* (2013.01); *H01M 4/70* (2013.01); *H01M 10/052* (2013.01); *H01M 10/0525* (2013.01); *H01M 2004/021* (2013.01); *H01M 2220/20* (2013.01); *Y02E 60/10* (2013.01)

(58) Field of Classification Search
CPC ...... H01M 4/623; H01M 4/625; H01M 4/661; H01M 4/70; H01M 10/0525; H01M 2004/021; Y02E 60/10
See application file for complete search history.

(56) References Cited

U.S. PATENT DOCUMENTS

| | | | | |
|---|---|---|---|---|
| 2010/0159325 A1* | 6/2010 | Sugiura | .............. | C01G 45/1228 |
| | | | | 429/223 |
| 2011/0104542 A1 | 5/2011 | Gan | | |

| | | | | |
|---|---|---|---|---|
| 2017/0214098 A1 | 7/2017 | Sawai et al. | | |
| 2018/0277847 A1* | 9/2018 | Saidi | ..................... | H01M 4/623 |
| 2019/0229341 A1 | 7/2019 | Lee et al. | | |
| 2019/0237748 A1 | 8/2019 | Shin et al. | | |
| 2020/0212495 A1* | 7/2020 | Lee | ......................... | H01M 4/74 |
| 2021/0050599 A1 | 2/2021 | Lee et al. | | |
| 2023/0216017 A1* | 7/2023 | Son | ........................ | H01M 4/666 |
| | | | | 427/558 |
| 2023/0246202 A1* | 8/2023 | Lee | ..................... | H01M 4/8875 |
| | | | | 429/209 |

FOREIGN PATENT DOCUMENTS

| | | | |
|---|---|---|---|
| EP | 3193392 A1 | 7/2017 | |
| EP | 3370280 A1 | 9/2018 | |
| KR | 10-2016-0004737 | 1/2016 | |
| KR | 10-2018-0016917 | 2/2018 | |
| KR | 2018-0023822 A | 3/2018 | |
| KR | 10-2019-0001461 | 1/2019 | |
| KR | 2019-0048123 A | 5/2019 | |
| KR | 10-2020-0090744 | 7/2020 | |
| WO | WO 2006-027866 A1 | 3/2006 | |

OTHER PUBLICATIONS

Office Action issued May 26, 2025 by the Korean Intellectual Property Office for corresponding Korean Patent Application No. 10-2021-0099439, 7 pages.

* cited by examiner

ELECTRODE INCLUDING ELECTRODE ACTIVE MATERIAL HAVING THROUGH-HOLES, LITHIUM BATTERY CONTAINING THE SAME, AND METHOD OF PREPARING THE SAME

CROSS-REFERENCE TO RELATED APPLICATION

This application claims priority to and the benefit of Korean Patent Application No. 10-2021-0099439, filed on Jul. 28, 2021, in the Korean Intellectual Property Office, the disclosure of which is incorporated by reference herein in its entirety.

BACKGROUND

1. Field

One or more embodiments of the present disclosure are related to an electrode, a lithium battery employing the same, and a method of preparing the same.

2. Description of the Related Art

As various devices are increasingly miniaturized and have higher performance, it has become important for lithium batteries to have higher energy density as well as miniaturization and weight reduction. That is, lithium batteries having high capacity have become increasingly important.

In addition, as various wearable devices appear in the market, lithium batteries with increased flexibility have become increasingly important.

To realize lithium batteries suitable for such uses, electrodes having flexibility as well as high loading capacity are being studied.

In an electrode with high loading capacity, the distribution of constituent components inside the electrode may become non-uniform and density near the electrode surface may increase. Accordingly, performance of a lithium battery employing such an electrode may decrease.

In this context, there is a need for an electrode capable of preventing or reducing a decrease in performance in lithium batteries and having flexibility.

SUMMARY

Aspect of one or more embodiments of the present disclosure are directed towards a novel electrode capable of preventing or reducing performance degradation in a battery by having substantially uniform distribution of constituent components inside the electrode.

In addition, aspects of one or more embodiments are directed towards a novel electrode capable of preventing or reducing performance degradation in a battery and increasing flexibility of the battery by including an electrode current collector positioned in a part of the electrode, and including through-holes in an electrode active material layer.

Further aspects of one or more embodiments are directed towards a lithium battery including the electrode.

Further aspects of one or more embodiments are directed towards a preparation method of the electrode.

Additional aspects will be set forth in part in the description that follows and, in part, will be apparent from the description, or may be learned by practice of the presented embodiments of the disclosure.

According to one or more embodiments of the present disclosure, an electrode includes: an electrode active material layer containing an electrode active material and a binder; and an electrode current collector at a portion of the electrode active material layer on (or at) one side of the electrode active material layer, or at a portion of the electrode active material layer between opposing sides of the electrode active material layer, wherein the electrode active material layer includes a plurality of through-holes.

According to one or more embodiments of the present disclosure, a lithium battery includes: a cathode; an anode; and an electrolyte between the cathode and the anode, wherein at least one of the cathode or the anode is the electrode described above.

According to one or more embodiments of the present disclosure, an electrode preparation method includes: preparing a mixture by dry mixing an electrode active material, a dry conductive material, and a dry binder; providing an electrode current collector; preparing an electrode including an electrode active material layer on one side or opposite sides (sides facing opposite each other) of the electrode current collector, by placing and rolling the mixture on the one side or opposite sides of the electrode current collector; and introducing a plurality of through-holes into the electrode active material layer, wherein the introduction of the plurality of through-holes is carried out concurrently with (e.g., at the same time as) the rolling, or subsequent to the rolling.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
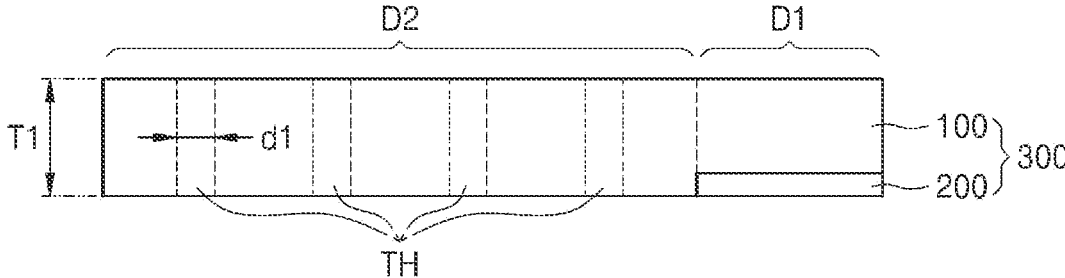
FIGS. 1A-1B are cross-sectional views of an electrode according to one or more embodiments of the present disclosure.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described, by referring to the drawings, to explain aspects of the present description. These embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

As used herein, the term "and/or" includes any and all combinations of one or more of the associated listed items. Expressions such as "at least one of," when preceding a list of elements, modify the entire list of elements and do not modify the individual elements of the list. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

The present disclosure described hereinbelow may have various modifications and various embodiments, example embodiments will be illustrated in the drawings and more fully described in the detailed description. The present disclosure may, however, should not be construed as limited to the example embodiments set forth herein, and rather, should be understood as covering all modifications, equivalents, or alternatives falling within the scope of the present disclosure.

The terms used herein is for the purpose of describing particular embodiments only, and is not intended to be limiting the present disclosure. As used herein, the singular forms "a" and "an" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, "/" may be interpreted as "and", or as "or" depending on the context.

In the drawings, thicknesses may be magnified or exaggerated to clearly illustrate various layers and regions. Like reference numbers may refer to like elements throughout, and duplicative descriptions thereof may not be provided in the drawings and the following description. It will be understood that when one element, layer, film, section, sheet, etc. is referred to as being "on," "connected to," or "coupled to," another element, it can be directly on, connected to, or coupled to the other element or intervening elements may be present therebetween. In addition, it will also be understood that when an element or layer is referred to as being "between" two elements or layers, it can be the only element or layer between the two elements or layers, or one or more intervening elements or layers may also be present.

Although the terms "first," "second," etc. may be used herein to describe various elements, these elements should not be limited by these terms. These terms are only used to distinguish one element from another element.

Spatially relative terms, such as "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the term "substantially," "about," and similar terms are used as terms of approximation and not as terms of degree, and are intended to account for the inherent deviations in measured or calculated values that would be recognized by those of ordinary skill in the art. "Substantially" or "about" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" or "about" may mean within one or more standard deviations, or within ±30%, 20%, 10%, 5% of the stated value. Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As used herein, the term "dry" refers to a state that is deliberately not in contact with solvents, such as processing solvents, or a state that deliberately does not contain solvents. For example, a dry electrode active material refers to an electrode active material that is deliberately not in contact with solvents, or an electrode active material that deliberately does not contain solvents. For example, a dry conductive material refers to a conductive material that is deliberately not in contact with solvents, or a conductive material that deliberately does not contain solvents. For example, a dry binder refers to a binder that is deliberately not in contact with solvents, or a binder that deliberately does not contain solvents (i.e., not contain any solvent). For example, a binder that does not mix with solvents while remaining in a liquid state at room temperature is a dry binder.

As used in this specification, a length of an electrode, a thickness of an electrode, a diameter of through-holes, a depth of through-holes, and a surface area of through-holes refer to an average length of the electrode, an average thickness of the electrode, an average diameter of the through-holes, an average depth of the through-holes, and an average surface area of the through-holes, respectively. An average value is, for example, an arithmetic mean of values measured at a plurality of points. A length of an electrode, a thickness of an electrode, a diameter (breadth size) of a through-hole (or through-via), a depth of a through-hole, and a surface area of a through-hole may be each measured using a micrometer, or from a scanning electron microscopic image, or an optical microscopic image.

As used herein, the term "diameter" of a particle refers to an average diameter of the particle when the particle is spherical, and for a non-spherical particle, refers to an average major axis length of the particle. The diameter of a particle may be measured using a particle size analyzer (PSA). A "diameter" of a particle is, for example, an average diameter. The average diameter is, for example, a median particle diameter (D50). The median particle diameter (D50) refers to the size of particles corresponding to 50% cumulative volume in a distribution of particle sizes measured by a laser diffraction method, counted from the side of particles having the smallest particle size.

Hereinbelow, an electrode, a lithium battery including the same, and a method of preparing the same according to embodiments will be described in greater detail.

An electrode according to one or more embodiments includes: an electrode active material layer containing an electrode active material and a binder; and an electrode current collector positioned at a portion on one side of the electrode active material layer, or at a portion between opposing sides (sides facing each other) of the electrode active material layer, wherein the electrode active material layer includes a plurality of through-holes.

In the electrode, as the portion of the electrode current collector is on one side, or between opposing sides, of the electrode active material layer, the volume occupied by the electrode current collector in the electrode decreases. Accordingly, the energy density of a lithium battery including an electrode with such a decreased volume occupied by electrode current collector increases. Accordingly, a lithium battery providing an improved output can be provided.

In one or more embodiments, as the electrode active material layer includes a plurality of through-holes, high rate capability of the lithium battery is further improved. For example, as the electrolyte solution is disposed in a plurality of through-holes, the contact area between the electrode and an electrolyte solution increases, and a conduction distance of lithium ions inside the electrode active material layer decreases. For example, the plurality of through-holes function as ion conduction channels. Accordingly, by utilizing the plurality of through-holes, an increase in internal resistance and degradation of high rate capability due to an imbalance of electrode reactions on the electrode surface and inside the electrode can be effectively suppressed or reduced. In one or more embodiments, in a high-density battery including an electrode with increased thickness and/or a laminated body thereof, degradation in cycle characteristics at a high current density can be effectively prevented or reduced.

Consequently, in a lithium battery employing an electrode including a plurality of through-holes, internal resistance can be decreased, and degradation in high rate capability can be prevented or reduced. In one or more embodiments, as the electrode active material layer includes a plurality of through-holes, flexibility of the lithium battery can be further improved. Accordingly, a lithium battery including an electrode with improved flexibility can be more suitable for use in shape-variable devices, such as wearable devices.

The electrode may include: a first domain including an electrode active material layer, and an electrode current collector positioned on one side or between both (opposing or facing) sides of the electrode active material layer; and a second domain including the electrode active material layer, and free of (not including) the electrode current collector on the one side or between the opposing sides of the electrode active material layer. In one or more embodiments, the second domain may include a plurality of through-holes, and the first domain may be free of through-holes (not including any through-hole). As the second domain free of the electrode current collector on one side or between opposing sides of the electrode active material layer includes a plurality of through-holes, flexibility of the electrode can be increased, and high rate capability of the lithium battery can be further improved. Because the contact area between the electrode active material layer and the electrode current collector increases as the first domain including the electrode current collector positioned on one side or between opposing sides of the electrode active material layer is free of through-holes, degradation in high rate capability caused by an electrical current concentrated on the electrode current collector during charging/discharging can be prevented or reduced, and adhesion between the electrode active material layer and the electrode current collector can be further improved.

The electrode may be, for example, a stretchable electrode. The stretchable electrode may be stretchable in one or more directions including (e.g., selected from) a length direction and a width direction of the stretchable electrode. The stretchable electrode may be stretched, for example, by 5% or more, by 10% or more, by 15% or more, by 20% or more, by 30% or more, by 40% or more, or by 50% or more, in the length direction of the stretchable electrode. The stretchable electrode may be stretched, for example, by about 5% to about 100%, by about 10% to about 100%, by about 15% to about 100%, by about 20% to about 100%, by about 30% to about 100%, by about 40% to about 100%, or by about 50% to about 100%, in the length direction of the electrode. The stretchable electrode may be stretched, for example, by 5% or more, by 10% or more, by 15% or more, by 20% or more, by 30% or more, by 40% or more, or by 50% or more, in the width direction of the electrode. The stretchable electrode may be stretched, for example, by about 5% to about 100%, by about 10% to about 100%, by about 15% to about 100%, by about 20% to about 100%, by about 30% to about 100%, by about 40% to about 100%, or by about 50% to about 100%, in the width direction of the electrode. The stretchable electrode, for example, can be restored after stretching to an initial length without suffering cracks and/or the like within the electrode, and cracks and/or the like may not occur in the electrode even when subjected to such a cycle repeatedly multiple times. As the stretchable electrode contains an electrode current collector only in a first domain and does not contain an electrode current collector in a second domain, the second domain can be easily stretched. In one or more embodiments, because the electrode current collector is disposed only in a portion of the electrode, even when stacking a plurality of electrodes and then winding or bending the same, separation of electrode active material layers and electrode current collectors can be minimized or reduced, and lithium batteries of one or more suitable forms can be easily implemented.

One side of the electrode may include, for example, a surface A in which a plurality of through-holes is formed. For example, the surface area of the surface A may be, for example, 99% or less, 90% or less, 50% or less, 40% or less, 30% or less, 20% or less, or 10% or less, of the entire surface area of one side of the electrode. The surface area of the surface A may be, for example, about 0.1% to about 99%, about 0.1% to about 90%, about 0.1% to about 50%, about 0.1% to about 30%, about 0.2% to about 20%, about 0.2% to about 15%, about 0.2% to about 10%, or about 0.2% to about 5%, of the entire surface area of one side of the electrode. As the surface area of the surface A that the through-holes occupy has a value in the above ranges, the cycle characteristics of the lithium battery may be further enhanced. The surface A is a surface area of the surface of the electrode that the through-holes occupy.

One side of the electrode may include, for example, a surface A in which a plurality of through-holes is formed, and a surface B formed of an electrode active material layer, and the surface area of the surface A may be smaller than the surface area of the surface B. For example, the surface area of the surface A may be, for example, 99% or less, 90% or less, 50% or less, 40% or less, 30% or less, 20% or less, or 10% or less, of the surface area of the surface B. The surface area of the surface A may be, for example, about 0.1% to about 99%, about 0.1% to about 90%, about 0.1% to about 50%, about 0.1% to about 30%, about 0.1% to about 20%, about 0.1% to about 15%, about 0.1% to about 10%, or about 0.1% to about 5%, of the surface area of the surface B. As the surface area of the surface A, in which through-holes are formed, has a value in the above ranges, the cycle characteristics of the lithium battery may be further enhanced.

An average diameter d1 of the plurality of through-holes is, for example, about 0.1 μm to about 20 μm, about 0.1 μm to about 15 μm, about 0.1 μm to about 10 μm, about 0.1 μm to about 5 μm, or about 0.1 μm to about 1 μm. As the plurality of through-holes has an average diameter in the above ranges, the cycle characteristics of a lithium battery employing an electrode containing the plurality of the through-holes may be further enhanced.

A ratio (d1/T1) of the average diameter d1 of the plurality of through-holes to a thickness T1 of the electrode active material layer may be about 0.001 to about 0.2, about 0.001 to about 0.15, about 0.001 to about 0.1, about 0.001 to about 0.05, or about 0.001 to about 0.01. As the ratio (d1/T1) of the average thickness d of the plurality of through-holes to the thickness T1 of the electrode active material layer has a value in the above ranges, the cycle characteristics of a lithium battery that employs an electrode containing the plurality of through-holes may be further enhanced.

For example, the plurality of through-holes included in the electrode may be positioned regularly with a substantially uniform interval therebetween in the electrode active material layer. As the plurality of through-holes are positioned regularly in the electrode active material layer, a regular current density distribution inside the electrode may be maintained. Accordingly, local degradations in the electrode active material layer caused by an irregular current distribution can be prevented or reduced, and consequently, degradations in cycle characteristics of a lithium battery can be prevented or reduced.

The plurality of through-holes included in the electrode may be, for example, periodically disposed with a substantially uniform interval therebetween in the electrode active material layer. As the plurality of through-holes is periodically positioned in the electrode active material layer, a periodic current density distribution may be maintained inside the electrode. Accordingly, local degradations in the electrode active material layer caused by an aperiodic current distribution can be prevented or reduced, and consequently, degradations in cycle characteristics of a lithium battery can be prevented or reduced.

The plurality of through-holes included in the electrode may be positioned, for example, two-dimensionally or three-dimensionally so as to have a lattice structure. As the plurality of through-holes is two-dimensionally or three-dimensionally positioned so as to have a lattice structure in the electrode active material layer included in the electrode, the cycle characteristics of a lithium battery including such an electrode may be further improved.

An entrance (opening) of each of the through-holes included in the electrode may have, but is not limited to, at least one of (e.g., one shape selected from among) a circular shape, an oval shape, a triangular shape, a rectangular shape, a pentagonal shape, a hexagonal shape, an alphabet shape, and/or a donut shape, and/or may have any shape that is utilized in the relevant technical field and forms a through-hole. Examples of the alphabet shape may include at least one of (e.g., one shape selected from) the shapes of A to Z. Examples of the alphabet shape may include at least one of (e.g., one shape selected from among) an X shape, an H shape, a T shape, an L shape, and/or the like. The entrance of the through-hole may have, for example, a polyhedral shape.

The shape of each of the through-holes may be determined from a scanning electron microscopic image or an optical microscopic image of a surface of the electrode.

For example, each of the through-holes included in the electrode may be positioned to pass through the electrode active material layer so as to form an angle of about 60 degrees to about 120 degrees, about 70 degrees to about 110 degrees, or about 80 degrees to about 100 degrees, with one side or opposing sides of the electrode active material layer. As the through-holes are positioned to form such an angle, the cycle characteristics of the lithium battery may be further improved.

A cross-section of the electrode may include, for example, a structure in which the electrode active material layer and the through-holes are alternately aligned. As the cross-section of the electrode has a structure in which the electrode active material layer and the through-holes are alternately aligned, a lithium battery including such an electrode may have further improved cycle characteristics.

The electrode current collector may further include an interlayer disposed on one side or opposite sides of the electrode current collector.

The material forming the electrode current collector may be a material that does not react with lithium, e.g., any material that does not form an alloy or a compound with lithium and has conductivity (e.g., is a conductor). The metal substrate may be, for example, a metal or an alloy. Examples of the metal substrate include indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. Examples of the electrode current collector may include at least one of (e.g., one shape selected from among) a sheet, a foil, a film, a plate, a porous body, a mesoporous body, a through-hole containing body, a polygonal ring body, a mesh body, a foam, and/or a non-woven body, but are not limited thereto and may be any shape utilized in the relevant technical field.

The interlayer may be, for example, directly positioned on one side or opposite sides of the electrode current collector. As such, there may be no other layer positioned between the electrode current collector and the interlayer. As the interlayer is directly positioned on one side or opposite sides of the electrode current collector, adhesion between the electrode current collector and the electrode active material layer may be further improved.

A thickness of the interlayer may be, for example, 30% or less of a thickness of the electrode current collector. The thickness of the interlayer may be, for example, about 0.01% to about 30%, about 0.1% to about 30%, about 0.5% to about 30%, about 1% to about 25%, about 1% to about 20%, about 1% to about 15%, about 1% to about 10%, about 1% to about 5%, or about 1% to about 3%, of the thickness of the electrode current collector. The thickness of the interlayer may be, for example, about 10 nm to about 5 $\mu$m, about 50 nm to about 5 $\mu$m, about 200 nm to about 4 $\mu$m, about 500 nm to about 3 $\mu$m, about 500 nm to about 2 $\mu$m, about 500 nm to about 1.5 $\mu$m, or about 700 nm to about 1.3 $\mu$m. As the interlay has a thickness in the above ranges, adhesion between the electrode current collector and the electrode active material layer may be further improved, and an increase in interfacial resistance may be suppressed or reduced.

The interlayer may include, for example, a binder. As the interlayer includes a binder, adhesion between the electrode current collector and the electrode current collector may be further improved. The binder included in the interlayer may be, for example, a conductive binder or a non-conductive binder.

Examples of the conductive binder include an ion-conducting binder and/or an electron-conducting binder. A binder having both (e.g., simultaneously) ion conductivity and electron conductivity may belong to both (e.g., simultaneously) the ion-conducting binder and the electron-conducting binder.

Examples of the ion-conducting binder include polystyrene sulfonate (PSS), polyvinylidene fluoride-hexafluoropropylene (PVDF-HFP), polyvinyl fluoride (PVF), polyvinylidene fluoride (PVDF), poly(methyl methacrylate) (PMMA), polyethylene oxide (PEO), polyethylene glycol (PEG), polyacrylonitrile (PAN), polytetrafluoroethylene (PTFE), polyethylene dioxythiophene (PEDOT), polypyrrole (PPY), polyacrylonitrile (PAN), polyaniline, polyacetylene, and/or any other suitable ion-conducting binder(s). The ion-conducting binder may contain a polar functional group. Examples of the ion-conducting binder containing a polar functional group include Nafion, Aquivion, Flemion, Gore, Aciplex, Morgane ADP, sulfonated poly(ether ketone) (SPEEK), sulfonated poly(arylene ether ketone sulfone) (SPAEKKS), sulfonated poly(aryl ether ketone) (SPAEK), poly[bis(benzimidazobenzisoquinolinones)], (SPBIBI), poly(styrene sulfonate) (PSS), lithium 9,10-diphenylanthracene-2-sulfonate (DPASLi+), and/or any other suitable ion-conducting binder(s) containing a polar functional group. Examples of the electron-conducting binder include polyacetylene, polythiophene, polypyrrole, poly(p-phenylene), poly(phenylenevinylene), poly(phenylenesulfide), polyaniline, and/or any other suitable electron-conducting binder(s). The interlayer may be, for example, a conductive layer including a conductive polymer.

The binder included in the interlayer may include (e.g., may be selected from among) binders included in the electrode active material layer, for example. The interlayer may include the same binder as the electrode active material layer. The binder included in the interlayer may be, for example, a fluorine-based binder. The fluorine-based binder included in the interlayer may be, for example, polyvinylidene fluoride (PVDF). The interlayer may be positioned on the electrode current collector by, for example, a dry method or a wet method. The interlayer may be, for example, a tie layer containing a binder.

The interlayer may include, for example, a carbon-based conductive material. The carbon-based conductive material included in the interlayer may include (e.g., may be selected from among) carbon-based conductive materials included in the electrode active material layer. The interlayer may include the same carbon-based conductive material as the electrode active material layer. As the interlayer includes a carbon-based conductive material, the interlayer may be, for example, a conductive layer. The interlayer may be, for example, a conductive layer containing a binder and a carbon-based conductive material.

The interlayer may be disposed on the electrode current collector by, for example, a dry method such as deposition, e.g., chemical vapor deposition (CVD), physical vapor deposition (PVD), and/or any other suitable dry method(s). The interlayer may be disposed on the electrode current collector by, for example, a wet method, such as spin coating, dip coating, and/or any other suitable wet method(s). The interlayer may be disposed on the electrode current collector by depositing a carbon-based conductive material on the electrode current collector by deposition. A dry-coated interlayer may be formed of a carbon-based conductive material and may not contain binders. In one or more embodiments, the interlayer may be disposed on the electrode current collector by coating and drying a composition containing a carbon-based conductive material, a binder, and a solvent, on a surface of the electrode current collector. The interlayer may be a single-layer structure, or may be a multilayer structure including multiple layers.

The electrode current collector may have a comparatively reduced thickness when compared to an electrode current collector included in electrodes in the related art. Accordingly, an electrode according to one or more embodiments, by including a thin-film current collector for example, can be distinguished from electrodes in the related art that include a thick-film current collector. As the electrode according to one or more embodiments employs a thin-film current collector having a reduced thickness, the thickness of an electrode active material layer in the electrode including the thin-film current collector relatively increases. Consequently, a lithium battery employing such an electrode has an increased energy density. A thickness of the electrode current collector including a metal substrate and an interlayer may be, for example, less than 15 μm, 14.5 μm or less, or 14 μm or less. The thickness of the electrode current collector may be, for example, about 0.1 μm to less than about 15 μm, about 1 μm to about 14.5 μm, about 2 μm to about 14 μm, about 3 μm to about 14 μm, about 5 μm to about 14 μm, or about 10 μm to about 14 μm.

The binder included in the electrode active material layer may be, for example, a dry binder. The dry binder is, for example, a binder that does not become impregnated, dissolved, nor dispersed in a solvent. The dry binder may be, for example, a binder that contains a solvent or is not in contact with a solvent.

The dry binder may be, for example, a fibrillized binder. The fibrillized binder may serve as a matrix that supports and binds together an electrode active material and other components included in the electrode active material layer. The fibrillized binder may be determined as having a fibrous form from, for example, a scanning electron microscopic image of a cross-section of the electrode. The fibrillized binder may have, for example, an aspect ratio of 10 or more, 20 or more, 50 or more, or 100 or more.

Examples of the dry binder include, but are not limited to, polytetrafluoroethylene (PTFE), a polyvinylidene fluoride-hexapropylene (PVDF-HFP) copolymer, a polyvinylidene fluoride (PVDF), a polyvinyl alcohol, polyacrylonitrile, carboxymethylcellulose (CMC), starch, hydroxypropyl cellulose, cellulose, polyvinylpyrrolidone, polyethylene, polypropylene, ethylene-propylene-diene polymer (EPDM), sulfonated-EPDM, styrene butadiene rubber (SBR), fluoro rubber, and copolymers thereof. Any binder utilized in the preparation of dry electrodes may be utilized. The dry binder may include, in one or more embodiments, a fluorine-based binder. The fluorine-based binder may be, for example, polytetrafluoroethylene (PTFE), a polyvinylidene fluoride-hexapropylene (PVDF-HFP) copolymer, or polyvinylidene fluoride (PVDF).

The amount of the dry binder included in the electrode active material layer may be, for example, about 1 wt % to about 10 wt %, or about 1 wt % to about 5 wt %, with respect to the total weight of the electrode active material layer. As the electrode active material layer includes a dry binder in the above ranges, the electrode may have an improved adhesion and can maintain a high energy density.

The electrode active material layer may further include, for example, a conductive material. The conductive material may be, for example, a dry conductive material. The dry conductive material may be, for example, a conductive material that does not become impregnated, dissolved nor dispersed in a solvent. The dry conductive material may be, for example, a conductive material that does not contain a solvent or is not in contact with a solvent. The dry conductive material may include, for example, a carbon-based conductive material. Examples of the carbon-based conductive material include, but are not limited to, carbon black, graphite particles, natural graphite, artificial graphite, acetylene black, Ketjenblack®, carbon fibers; carbon nanotubes; and/or any other suitable carbon-based conductive material(s), and any material utilized as a carbon-based conductive material in the relevant technical field may be utilized.

The amount of the dry conductive material included in the electrode active material layer may be, for example, about 1 wt % to about 10 wt %, or about 1 wt % to about 5 wt %, with respect to the total weight of the electrode active material layer. As the electrode active material layer includes a dry conductive material in the above ranges, the electrode may have improved conductivity and can maintain high energy density.

The electrode active material layer may be, for example, a self-standing film. The electrode active material layer can retain the shape of a film without, for example, a support. Accordingly, the electrode active material layer may be prepared as a separate self-standing film and positioned on an electrode current collector. The electrode active material layer is prepared by a dry method and thus, contains no deliberately added processing solvent. For example, the electrode active material layer may not contain any residual processing solvent. There may be a minute amount of solvent incidentally remaining in the electrode active material layer, but such a solvent would not be any processing solvent that was deliberately added. Accordingly, the electrode active material layer is distinguished from wet-type or kind electrode active material layers that are prepared by mixing components with a processing solvent, and then partially or completely removing the processing solvent therefrom by drying.

In the electrode, in the electrode active material layer included in the first domain, when measured by SAICAS (surface and interfacial cutting analysis system), a rate of change in a vertical relative force ($F_{VR}$) as a function of depth, from a first point to a second point, may be 300% or less, the first point being spaced apart by 5% in a direction of the electrode current collector from a surface of the electrode active material layer, and the second point being spaced apart by 5% from a surface of the electrode current collector, with respect to the total thickness of the electrode active material layer.

The rate of change in the vertical relative force may be, for example, about 10% to about 300%, about 10% to about 250%, about 10% to about 200%, about 10% to about 150%, or about 10% to about 100%. The second point, which is spaced apart by 5% in a direction of the electrode active material layer from the surface of electrode current collector, corresponds to, for example, a point that is spaced apart by 95% in a direction of the electrode current collector from the surface of the electrode active material layer, with respect to the total thickness of the electrode active material layer. The vertical relative force is calculated by Equation 1. The method of SAICAS measurement is described in Evaluation Example 2 for example.

$$\text{Rate of Change in Vertical Relative Force } (F_V) = [(\text{Maximum Value of Vertical Relative Force } (F_{VR1}) - \text{Minimum Value of Vertical Relative Force } (F_{VR1}))/\text{Minimum Value of Vertical Relative Force } (F_{VR1})] \times 100 \qquad \text{Equation 1}$$

In the electrode, as the rate of change in vertical relative force is 300% or less when measured by SAICAS (surface and interfacial cutting analysis system), uniformity of distribution of constituent components inside the electrode may be improved. In one or more embodiments, because an increase in internal resistance and side reactions caused by a non-uniform distribution of constituent components inside the electrode active material layer are suppressed or reduced, reversibility of electrode reactions may be improved. Even an electrode with high loading, cycle characteristics of the lithium battery can be improved. In one or more embodiments, as the electrode includes an interlayer, adhesion force of the electrode active material layer and the electrode current collector can be further improved, and internal resistance of the electrode can be reduced. Accordingly, a lithium battery employing such an electrode may have improved cycle characteristics.

In the electrode, in the electrode active material layer included in the first domain, when measured by SAICAS, with respect to the total depth from a surface of the electrode active material layer to a surface of the electrode current collector, a horizontal force ratio of a second horizontal force ($F_{H2}$) at a second point to a first horizontal force ($F_{H1}$) at a first point may be 50% or more, the first point being spaced apart by 10% in a direction of the electrode active material layer (for example, a depth direction) from the surface of the electrode current collector, and the second point being spaced apart by 10% in a direction of the electrode current collector from a surface of the electrode active material layer. The horizontal force ratio may be, for example, about 50% to about 100%, about 60% to about 100%, about 70% to about 100%, about 80% to about 100%, or about 90% to about 100%. The second point, which is spaced apart by 10% in a direction of the electrode active material layer from the surface of the electrode current collector, corresponds to, for example, a point that is spaced apart by 90% in a direction of the electrode current collector from the surface of the electrode active material layer, with respect to the total thickness of the electrode active material layer. The horizontal force ratio is, for example, represented by Equation 2. The SAICAS measurement method is described in, for example, Evaluation Example 3.

$$\text{Horizontal Force Ratio}=[\text{Second Horizontal Force} \; (F_{H2})/\text{First Horizontal Force} \; (F_{H1})]\times100 \qquad \text{Equation 2}$$

As the horizontal force ratio is 50% or more as measured by SAICAS, uniformity of distribution of constituent components inside the electrode can be further improved. As the electrode has a horizontal relative force in the above range, a lithium battery employing such an electrode has further improved cycle characteristics.

The electrode may be, for example, a cathode. The cathode includes a cathode active material layer, and the cathode active material layer includes a cathode active material.

For the cathode active material included in the cathode active material layer, any lithium metal oxide that is commonly utilized in the relevant technical field may be utilized, without limitation.

Examples of the cathode active material include, for example, at least one of composite oxides of lithium and a metal including (e.g., selected from among) cobalt, manganese, nickel, and/or a combination thereof. For example, a compound represented by any one of the following chemical formulas may be utilized: $Li_aA_{1-b}B_bD_2$ (In the formula, $0.90 \le a \le 1$ and $0 \le b \le 0.5$); $Li_aE_{1-b}B_bO_{2-c}D_c$ (In the formula, $0.90 \le a \le 1$, $0 \le b \le 0.5$, and $0 \le c \le 0.05$); $LiE_{2-b}B_bO_{4-c}D_c$ (In the formula, $0 \le b \le 0.5$, and $0 \le c \le 0.05$); $Li_aNi_{1-b-c}Co_bB_cD_\alpha$ (In the formula, $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (In the formula, $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (In the formula, $0.90 \le a \le 1$, $0 \le b \le 0.5$, $0 \le c \le 0.05$, and $0 < \alpha < 2$); $Li_aNi_{1-b-c}Mn_bB_cD_\alpha$ (In the formula, $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (In the formula, $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (In the formula, $0.90 \le a \le 1$, $0 \le b \le 0.5$, $0 \le c \le 0.05$, and $0 < \alpha < 2$); $Li_aNi_bE_cG_dO_2$ (In the formula, $0.90 \le a \le 1$, $0 \le b \le 0.9$, $0 \le c \le 0.5$, and $0.001 \le d \le 0.1$); $Li_aNi_b$-$Co_cMn_dG_eO_2$ (In the formula, $0.90 \le a \le 1$, $0 \le b \le 0.9$, $0 \le c \le 0.5$, $0 \le d \le 0.5$, and $0.001 \le e \le 0.1$.); $Li_aCoG_bO_2$ (In the formula, $0.90 \le a \le 1$ and $0.001 \le b \le 0.1$.); $Li_aMnG_bO_2$ (In the formula, $0.90 \le a \le 1$ and $0.001 \le b \le 0.1$.); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and/or $LiFePO_4$.

In the chemical formulas representing the above compound: A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A compound including a coating layer added on the surface of the above compound may also be utilized, and a mixture of the above compound and another compound with a coating layer added thereon may also be utilized. The coating layer added on the surface of the above compound may include, for example, compounds of a coated element, such as an oxide and a hydroxide of the coated element, an oxyhydroxide of the coated element, an oxycarbonate of the coated element, and a hydroxycarbonate of the coated element. A compound forming such a coating layer may be amorphous or crystalline. The coated element included in the coating layer may be Mg, Al, Co, K, Na, Ca, Si, Ti, V, Sn, Ge, Ga, B, As, Zr, or a mixture thereof. The method of forming the coating layer includes (e.g., is selected from) methods that do not adversely affect physical properties of the cathode active material. The coating method may be, for example, a spray coating method, a dipping method, and/or any other suitable method(s). Such specific coating methods are well-understood by those of ordinary skill in the art in the relevant technical field, and as such will not be further described in more detail.

The amount of a cathode active material included in the cathode active material layer may be, for example, about 80 wt % to about 98 wt %, or about 90 wt % to about 98 wt %, with respect to the total weight of the cathode active material layer.

The cathode active material may be, for example, a composite cathode active material.

The composite cathode active material may include, for example: a core containing a lithium transition metal oxide; and a shell disposed along (e.g., around or on) a surface of the core, wherein the shell includes: at least one first metal oxide represented by chemical formula MaOb ($0 < a \le 3$, $0 < b < 4$, and when a is 1, 2, or 3, b is not an integer); and a carbonaceous material (e.g., graphene), wherein the first metal oxide is disposed within a graphene matrix, M is at least one metal including (e.g., selected from) Group 2 to Group 13, Group 15 and/or Group 16 in the periodic table, the lithium transition metal oxide contains nickel, and a nickel content (e.g., amount) is 80 mol % or more with respect to the total number of moles of the transition metal. The shell containing the first metal oxide and carbonaceous material (e.g., graphene) is disposed on the core of the composite cathode active material.

Graphene in the related art is difficult to coat evenly on the core due to aggregation. In contrast, the composite cathode active material, owing to the use of a composite containing a plurality of first metal oxides disposed in the graphene matrix, allows the shell to be evenly disposed on the core while preventing or reducing aggregation of graphene. Accordingly, by effectively preventing or reducing the contact between the core and an electrolyte, side reactions from the contact between the core and the electrolyte can be prevented or reduced. In one or more embodiments, as reduction of nickel ions ($Ni^{3+}$->$Ni^{2+}$), and cation mixing are suppressed or reduced, the formation of resistant layers, such as NiO phase, can be suppressed or reduced. In one or more embodiments, elution of nickel ions can also be suppressed or reduced. Because the shell containing carbonaceous material such as graphene has flexibility, changes in volume of the composite cathode active material during charging/discharging can be easily accommodated, thus suppressing or reducing crack formation in the composite cathode active material. Because graphene has high electron conductivity, interfacial resistance between the composite cathode active material and an electrolyte solution decreases. Accordingly, despite the introduction of the shell containing graphene, internal resistance in the lithium battery may remain substantially the same, or decrease. In one or more embodiments, because the first metal oxide has voltage resistance (e.g., high withstand voltage), degradation of the lithium transition metal oxide included in the core during charging/discharging at a high voltage may be prevented or reduced. Consequently, a lithium battery including the composite cathode active material may have improved cycle characteristics and high-temperature stability. The shell may include, for example, a first metal oxide of one kind, or first metal oxides of two or more kinds that are different from each another. In one or more embodiments, although the lithium transition metal oxide in the composite cathode active material has a high nickel content (e.g., amount) of 80 mol % or more with respect to the total number of moles of the transition metal, as the shell containing the first metal oxide and carbonaceous material such as graphene is disposed on the core, both (e.g., simultaneously) high discharge capacity and cycle characteristics can be provided. Accordingly, the composite cathode active material having a high nickel content (e.g., amount) of 80 mol % or more can provide excellent or suitable lifetime characteristics as well as a capacity improved over a composite cathode active material with a relatively low nickel content (e.g., amount). The metal included in the first metal oxide may be, for example, at least one of (e.g., one selected from among) Al, Nb, Mg, Sc, Ti, Zr, V, W, Mn, Fe, Co, Pd, Cu, Ag, Zn, Sb, and/or Se.

The first metal oxide may be, for example, at least one of (e.g., one selected from among) $Al_2O_z$ (0<z<3), $NbO_x$ (0<x<2.5), $MgO_x$ (0<x<1), $Sc_2O_z$ (0<z<3), $TiO_y$ (0<y<2), $ZrO_y$ (0<y<2), $V_2O_z$ (0<z<3), $WO_y$ (0<y<2), $MnO_y$ (0<y<2), $Fe_2O_z$ (0<z<3), $Co_3O_w$ (0<w<4), $PdO_x$ (0<x<1), $CuO_x$ (0<x<1), $AgO_x$ (0<x<1), $ZnO_x$ (0<x<1), $Sb_2O_z$ (0<z<3), and/or $SeO_y$ (0<y<2). As such a first metal oxide is positioned within the graphene matrix, uniformity of the shell positioned on the core can be improved, and withstand-voltage properties of the composite cathode active material can be further improved. For example, the shell may include $Al_2O_x$ (0<x<3) as a first metal oxide. The shell may further include a second metal oxide of one or more kinds, represented by $M_aO_c$ (0<a≤3, 0<c≤4, and when a is 1, 2, or 3, c is an integer). M is at least one metal from (e.g., selected from) Group 2 to Group 13, Group 15 and/or Group 16 in the periodic table. For example, the second metal oxide may include the same metal as the first metal oxide, and c/a, which is the ratio of c to a in the second metal oxide, may have a value greater than b/a, which is the ratio of b to a in the first metal oxide. For example, c/a>b/a. The second metal oxide may include (e.g., may be selected from among), for example, $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and/or $SeO_2$. The first metal oxide may be a reduction product of the second metal oxide. The first metal oxide may be obtained from the reduction of a portion, or all, of the second metal oxide. As a result, the first metal oxide has a lower oxygen content (e.g., amount) and a higher metal oxidation number compared to the second metal oxide. For example, the shell may include a first metal oxide, $Al_2O_x$ (0<x<3), and a second metal oxide, $Al_2O_3$. In the composite cathode active material, for example, graphene included in the shell and a transition metal of a lithium transition metal oxide included in the core may be chemically bound together through a chemical bond. The carbon atom (C) of graphene included in the shell, and a transition metal (Me) of the lithium transition metal oxide, may be chemically bound together, for example, via an oxygen atom as in a C—O-Me bond. As the graphene included in the shell, and the lithium transition metal oxide included in the core are chemically bound to each other through a chemical bond, the core and the shell form a complex. As a result, the complex is distinguished from a simple physical mixture of graphene and the lithium transition metal oxide. In one or more embodiments, graphene and the first metal oxide included the shell also, may be chemically bound to each other through a chemical bond. Here, the chemical bond may be, for example, a covalent bond or an ionic bond. The covalent bond may be a bond that includes, for example, at least one from among an ester group, an ether group, a carbonyl group, an amide group, a carbonate anhydride group, and/or an acid anhydride group. The ionic bond may be a bond that includes, for example, a carboxylic acid ion, an ammonium ion, an acyl cation group, and/or any other suitable ion(s). A thickness of the shell may be, for example, from about 1 nm to about 5 μm, from about 1 nm to about 1 μm, from about 1 nm to about 500 nm, from about 1 nm to about 200 nm, from about 1 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, or from about 1 nm to about 10 nm. As the shell has a thickness in the above ranges, an increase in internal resistance of a lithium battery including the composite cathode active material is suppressed or reduced.

The amount of the complex included in the composite cathode active material may be 3 wt % or less, 2 wt % or less, 1 wt % or less, 0.5 wt % or less, or 0.2 wt % or less, with respect to the total weight of the composite cathode active material. The amount of the complex may be about 0.01 wt % to about 3 wt %, about 0.01 wt % to about 1 wt %, about 0.01 wt % to about 0.7 wt %, about 0.01 wt % to about 0.6 wt %, about 0.1 wt % to about 0.5 wt %, about 0.01 wt % to about 0.2 wt %, about 0.01 wt % to about 0.1 wt %, or about 0.03 wt % to about 0.07 wt %, with respect to the total weight of the composite cathode active material. As the composite cathode active material includes the complex in the above ranges, a lithium battery including the composite cathode active material may have further improved cycle characteristics. At least one of the first metal oxide or the second metal oxide included in the complex may have an average diameter of about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, or about 7 nm to about 20 nm. As the first metal oxide and/or the second metal oxide have such a nano-sized diameter in the above ranges, the complex can be more uniformly distributed within the graphene matrix. As a result, such a complex can be uniformly coated on the core without aggregation, thereby forming a shell. In one or more embodiments, as the first metal oxide and/or the second metal oxide have a diameter in the above ranges, the first metal oxide and/or the second metal oxide may be more uniformly disposed on the core. As a result, as the first metal oxide and/or the second metal oxide are uniformly disposed on the core, withstand voltage characteristics can be more effectively realized. An average diameter of the first metal oxide and the second metal oxide may be measured by, for example, a measurement apparatus utilizing a laser diffraction method, or a dynamic light scattering method. The average diameter may be measured by, for example, a laser scattering particle size distribution analyzer (for example, LA-920 manufactured by HORIBA), and is a volume-based median particle diameter (D50) at a cumulative percentage of 50% from the smallest particle size (e.g., the value of the particle diameter at 50% in a cumulative distribution).

The core included in the composite cathode active material may include, for example, a lithium transition metal oxide represented by Formula 1.

$$\text{Li}_a\text{Ni}_x\text{Co}_y\text{M}_z\text{O}_{2-b}\text{A}_b \qquad \text{Formula 1}$$

In Formula 1, $1.0 \leq a \leq 1.2$, $0 \leq b \leq 0.2$, $0.7 \leq x < 1$, $0 < y < 0.3$, $0 < z < 0.3$, and $x+y+z=1$, M may be at least one of (e.g., is one selected from the group consisting of) manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and/or boron (B), and A is F, S, Cl, Br, or a combination thereof. In Formula 1, for example, $0.8 \leq x < 1$, $0 < y < 0.2$, $0 < z < 0.2$, and $x+y+z=1$.

The core included in the composite cathode active material may include, for example, a lithium transition metal oxide represented by Formulas 2 to 5.

$$\text{LiNi}_x\text{Co}_y\text{Mn}_z\text{O}_2 \qquad \text{Formula 2}$$

$$\text{LiNi}_x\text{Co}_y\text{Al}_z\text{O}_2 \qquad \text{Formula 3}$$

In the formulas above, $0.8 \leq x \leq 0.95$, $0 < y < 0.2$, $0 < z < 0.2$, and $x+y+z=1$.

$$\text{LiNi}_x\text{Co}_y\text{Al}_v\text{Mn}_w\text{O}_2 \qquad \text{Formula 4}$$

In the formula above, $0.8 \leq x \leq 0.95$, $0 < y < 0.2$, $0 < v < 0.2$, $0 < w < 0.2$, and $x+y+v+w=1$.

$$\text{Li}_a\text{Ni}_x\text{M}_z\text{O}_{2-b}\text{A}_b \qquad \text{Formula 5}$$

In Formula 5, $1.0 \leq a \leq 1.2$, $0 \leq b \leq 0.2$, $0.8 \leq x < 1$, $0 < z \leq 0.2$, and $x+z=1$, M may be at least one of (e.g., is one selected from the group consisting of) manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and/or boron (B), and A is F, S, Cl, Br, or a combination thereof. In Chemical Formula 5, for example, $1.0 \leq a \leq 1.2$, $0 \leq b \leq 0.2$, $0.8 \leq x \leq 0.95$, $0.5 \leq z \leq 0.2$, and $x+z=1$.

The electrode may be, for example, an anode. The anode includes an anode active material layer, and the anode active material layer includes an anode active material.

The anode active material may be any anode active material that is utilized for a lithium battery in the relevant technical field. For example, the anode active material includes one or more of (e.g., one selected from the group consisting of) lithium metal, a metal that can be alloyed with lithium, a transition metal oxide, a non-transition metal oxide, and/or a carbon-based material. Examples of the metal that can be alloyed with lithium may include Si, Sn, Al, Ge, Pb, Bi, Sb Si—Y alloys (Here, Y is an alkali metal, an alkali earth metal, a Group 13 element, a Group 14 element, a transition metal, a rare-earth element, or a combination of the aforementioned elements, and is not Si), a Sn—Y alloy (Here, Y is an alkali metal, an alkali earth metal, a Group 13 element, a Group 14 element, a transition metal, a rare-earth element, or a combination of the aforementioned elements, and is not Sn), and/or any other suitable metal(s). Element Y is, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxides are, for example, lithium titanium oxides, vanadium oxides, lithium vanadium oxides, and/or the like. The non-transition metal oxides are, for example, $\text{SnO}_2$, $\text{SiO}_x$ ($0 < x < 2$), and/or the like. The carbon-based materials are, for example, a crystalline carbon, an amorphous carbon, or a mixture thereof. The crystalline carbon is, for example, graphite such as artificial graphite or natural graphite that is amorphous, sheet type or kind, flake type or kind, spherical, or fibrous type or kind. The amorphous carbon is, for example, soft carbon (low-temperature sintered carbon) or hard carbon, meso-phase pitch carbides, sintered cokes, and/or any other suitable amorphous carbon.

The amount of anode active material included in the anode active material layer is, for example, from about 80 wt % to about 98 wt %, or from about 90 wt % to about 98 wt %, with respect to the total weight of the anode active material layer.

Referring to FIG. 1A, an electrode 300 according to one or more embodiments includes: an electrode active material layer 100 containing an electrode active material and a binder; and an electrode current collector 200 disposed on a portion of one side of the electrode active material layer 100, wherein the electrode active material layer 100 includes a plurality of through-holes (vias) TH. A first domain D1 is a domain that includes the electrode active material layer 100 and the electrode current collector 200 disposed on one side of the electrode active material layer 100. For example, the first domain D1 is a domain that includes the electrode current collector 200 and the electrode active material layer 100 disposed in a thickness direction of the electrode 300 on one side of the electrode current collector 200. A second domain D2 is a domain that includes the electrode active material layer 100 and is free of the electrode current collector 200 disposed on one side of the electrode active material layer 100. For example, the second domain D2 is the remaining area of the electrode active material layer 100 that does not include the first domain D1. In FIG. 1A, the demarcation between the first domain D1 and the second domain D2 may be, for example, made by a virtual dotted line disposed along an electrode thickness direction. The second domain D2 includes a plurality of through-holes TH having an arbitrary (or a set or predetermined) diameter d1. The first domain D1 and the second domain D2 that the electrode 300 includes have substantially the same thickness T1. The second domain D2 includes a plurality of through-holes, and an electrolyte, for example, lithium ions, is transferred through the plurality of through-holes. Accordingly, the second domain D2 is a domain that includes ion conduction channels. Accordingly, the electrode 300 including the second domain D2 is an electrode that includes ion conduction channels.

Figure 1B:
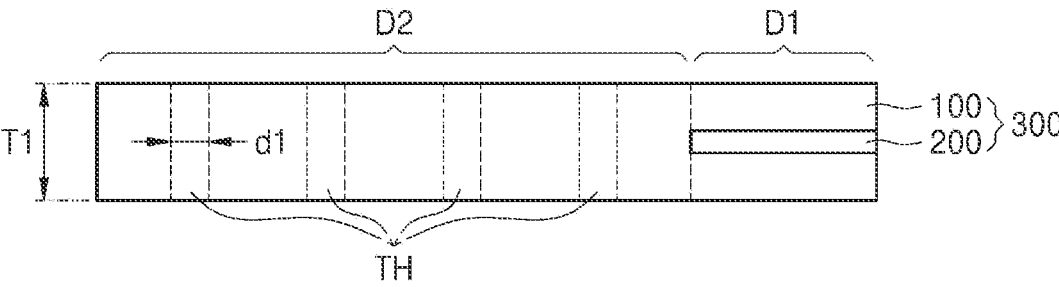

Referring to FIG. 1B, an electrode 300 according to one or more embodiments includes: an electrode active material layer 100 containing an electrode active material and a binder; and an electrode current collector 200 disposed on a portion of the electrode active material layer 100 between both (opposing or facing) sides of the electrode active material layer 100 (e.g., a portion of the electrode active material layer 100 is on opposite sides of the electrode current collector 200), wherein the electrode active material layer 100 includes a plurality of through-holes TH. A first domain D1 is a domain that includes the electrode active material layer 100 and the electrode current collector 200 disposed between opposing sides of the electrode active material layer (100) (e.g., the electrode active material layer 100 is on opposite sides of the electrode current collector 200). For example, the first domain D1 is a domain that includes the electrode current collector 200 and the electrode active material layer 100 disposed in an electrode thickness direction on opposite sides of the electrode current collector. The second domain D2 is a domain that includes the electrode active material layer 100 and is free of the electrode current collector 200 disposed between opposing sides of the electrode active material layer 100 (e.g., does not have the electrode active material layer 100 is on opposite sides of the electrode current collector 200). For example, the second domain D2 is the remaining area of the electrode active material layer 100 that does not include the first domain D1. In FIG. 1B, the demarcation between the first domain D1 and the second domain D2 may be, for example, made by a virtual dotted line disposed along the electrode thickness direction. The second domain D2 includes a plurality of through-holes TH having an arbitrary (or a set or predetermined) diameter d1. The first domain D1 and the second domain D2 that the electrode 300 includes have substantially the same thickness T1.

Figure 2A:
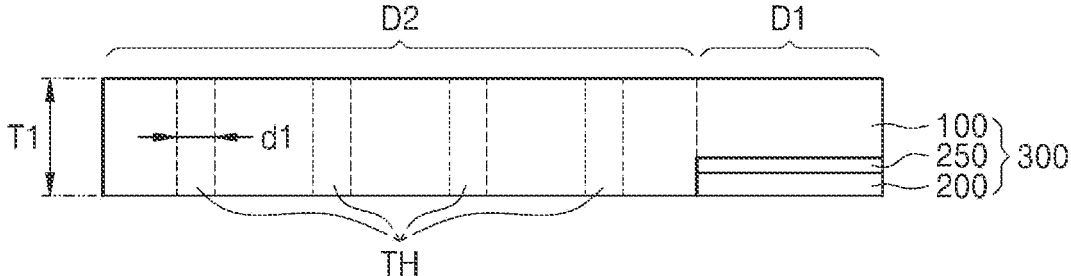
FIGS. 2A-2B are cross-sectional views of an electrode according to one or more embodiments of the present disclosure.

Referring to FIG. 2A, an electrode 300 according to one or more embodiments includes: an electrode active material layer 100 including an electrode active material and a binder; an electrode current collector 200 disposed on a portion of one side of the electrode active material layer 100; and an interlayer 250 disposed between the electrode active material layer 100 and the electrode current collector 200. The electrode in FIG. 2A, except that it further includes the interlayer 250, has the same features as the electrode in FIG. 1A.

Figure 2B:
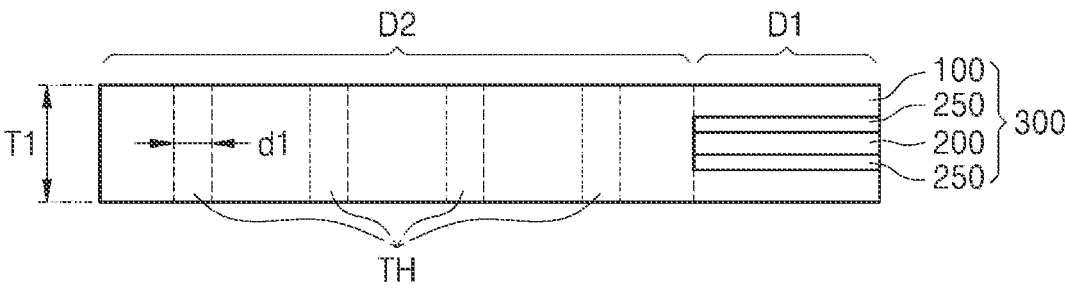

Referring to FIG. 2B, an electrode 300 according to one or more embodiments includes: an electrode active material layer 100 including an electrode active material and a binder; an electrode current collector 200 disposed on a portion of the electrode active material layer 100 between opposing sides of the electrode active material layer 100; and an interlayer (e.g., a coating layer 250 disposed between the electrode active material layer 100 and the electrode current collector 200. The electrode in FIG. 2B, except that it further includes another coating layer 250, has the same features as the electrode in FIG. 2A (i.e., the current collector 200 is between the two coating layers 250).

Figure 3A:
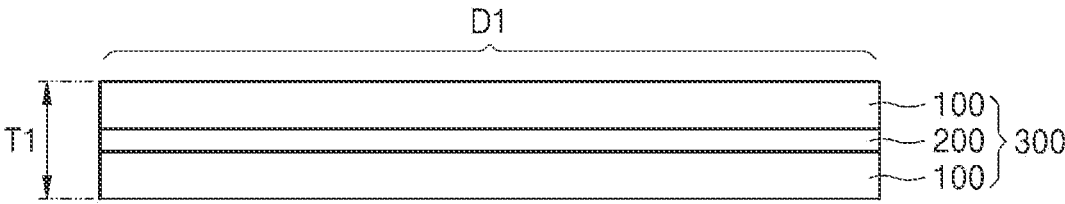
FIGS. 3A-3C are cross-sectional views of an electrode according to the related art.

Referring to FIG. 3A, a comparable electrode 300 includes: an electrode active material layer 100 including an electrode active material and a binder; and an electrode current collector 200 that is disposed between opposing sides of the electrode active material layer 100 and has the same shape and surface area as the electrode active material layer 100.

A first domain D1 is a domain that includes the electrode active material layer 100 and the electrode current collector 200 disposed between opposing sides of the electrode active material layer 100. For example, the first domain D1 is a domain that includes the electrode current collector 200 and the electrode active material layer 100 disposed in a thickness direction of the electrode on opposite sides of the electrode current collector. The electrode 300 is free of the second domain in which the electrode current collector 200 is not disposed on one side of the electrode active material layer 100. The electrode 300 does not include through-holes. A first domain D1 that the electrode 300 includes has an arbitrary thickness T1.

Figure 3B:
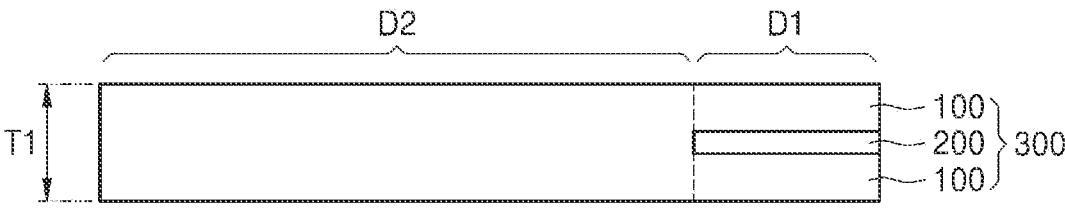

Referring to FIG. 3B, a comparable electrode 300 includes: an electrode active material layer 100 including an electrode active material and a binder; and an electrode current collector 200 disposed in a portion between opposing sides of the electrode active material layer 100.

A first domain D1 is a domain that includes the electrode active material layer 100 and the electrode current collector 200 disposed between opposing sides of the electrode active material layer 100. For example, the first domain D1 is a domain that includes the electrode current collector 200 and the electrode active material layer 100 disposed in an electrode thickness direction on opposite sides of the electrode current collector 200. The second domain D2 is a domain that includes the electrode active material layer 100 and is free of the electrode current collector 200 disposed between opposing sides of the electrode active material layer 100. For example, the second domain D2 is the remaining domain of the electrode active material layer 100, except the first domain D1. In FIG. 3B, the demarcation between the first domain D1 and the second domain D2 may be, for example, made by a virtual dotted line disposed along an electrode thickness direction. The electrode 300 does not include through-holes. A first domain D1 that the electrode (300) includes has an arbitrary thickness T1.

Figure 3C:
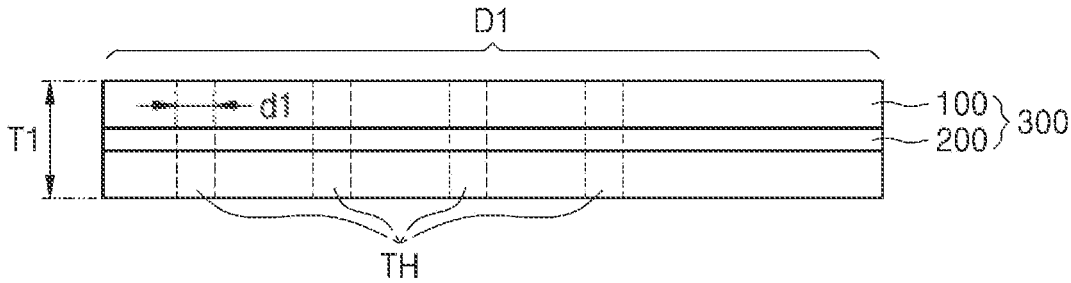

Referring to FIG. 3C, a comparable electrode 300 includes: an electrode active material layer 100 including an electrode active material and a binder; and an electrode current collector 200 that is disposed between opposing sides of the electrode active material layer 100 and has the same shape and surface area as the electrode active material layer 100, wherein the electrode active material layer 100 includes a plurality of through-holes.

A first domain D1 is a domain that includes the electrode active material layer 100 and the electrode current collector 200 disposed between opposing sides of the electrode active material layer 100. For example, the first domain D1 is a domain that includes the electrode current collector 200 and the electrode active material layer 100 disposed in an electrode thickness direction on opposite sides of the electrode current collector 200. The electrode (300) is free of the second domain in which the electrode current collector 200 is not disposed on one side of the electrode active material layer 100. The electrode 300 includes a plurality of through-holes TH that concurrently (e.g., simultaneously) pass through the electrode active material layer 100 and the electrode current collector 200, and have an arbitrary diameter d1. A first domain D1 that the electrode 300 includes has an arbitrary thickness T1.

Figure 4:
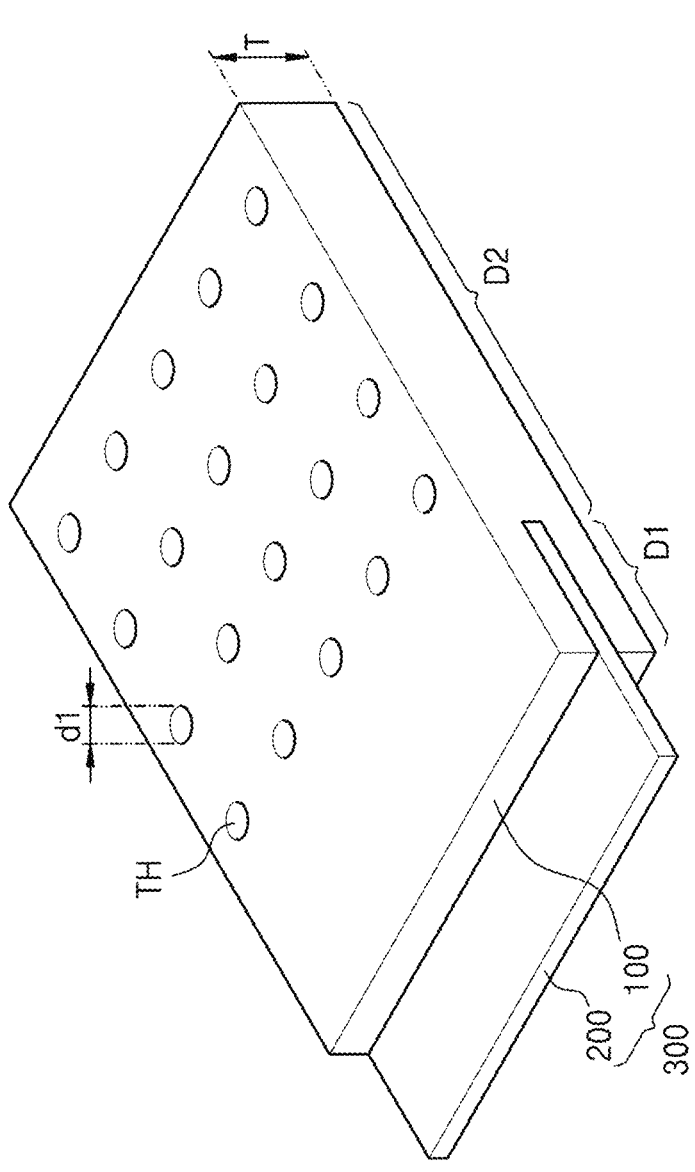
FIG. 4 is a schematic perspective view of an electrode according to one or more embodiments of the present disclosure.

Referring to FIG. 4, an electrode 300 according to one or more embodiments includes: an electrode active material layer 100 including an electrode active material and a binder; and an electrode current collector 200 disposed on a portion of the electrode active layer 100 between opposing sides of the electrode active material layer 100, wherein the electrode active material layer 100 includes a plurality of through-holes TH. A first domain D1 is a domain that includes the electrode active material layer 100 and the electrode current collector 200 positioned between opposing sides of the electrode active material layer 100. For example, the first domain (D1 is a domain that includes the electrode current collector 200 and the electrode active material layer 100 positioned in an electrode thickness direction on opposite sides of the electrode current collector 200. The second domain D2 is a domain that includes the electrode active material layer 100 and is free of the electrode current collector 200 disposed between opposing sides of the electrode active material layer 100. For example, the second domain D2 is the remaining domain of the electrode active material layer 100, except the first domain D1. The second domain D2 includes a plurality of through-holes TH having an arbitrary diameter d1. The first domain D1 and the second domain D2 that the electrode 300 includes have substantially the same thickness T. A cross-section of FIG. 4 corresponds to FIG. 1B.

Figure 5:
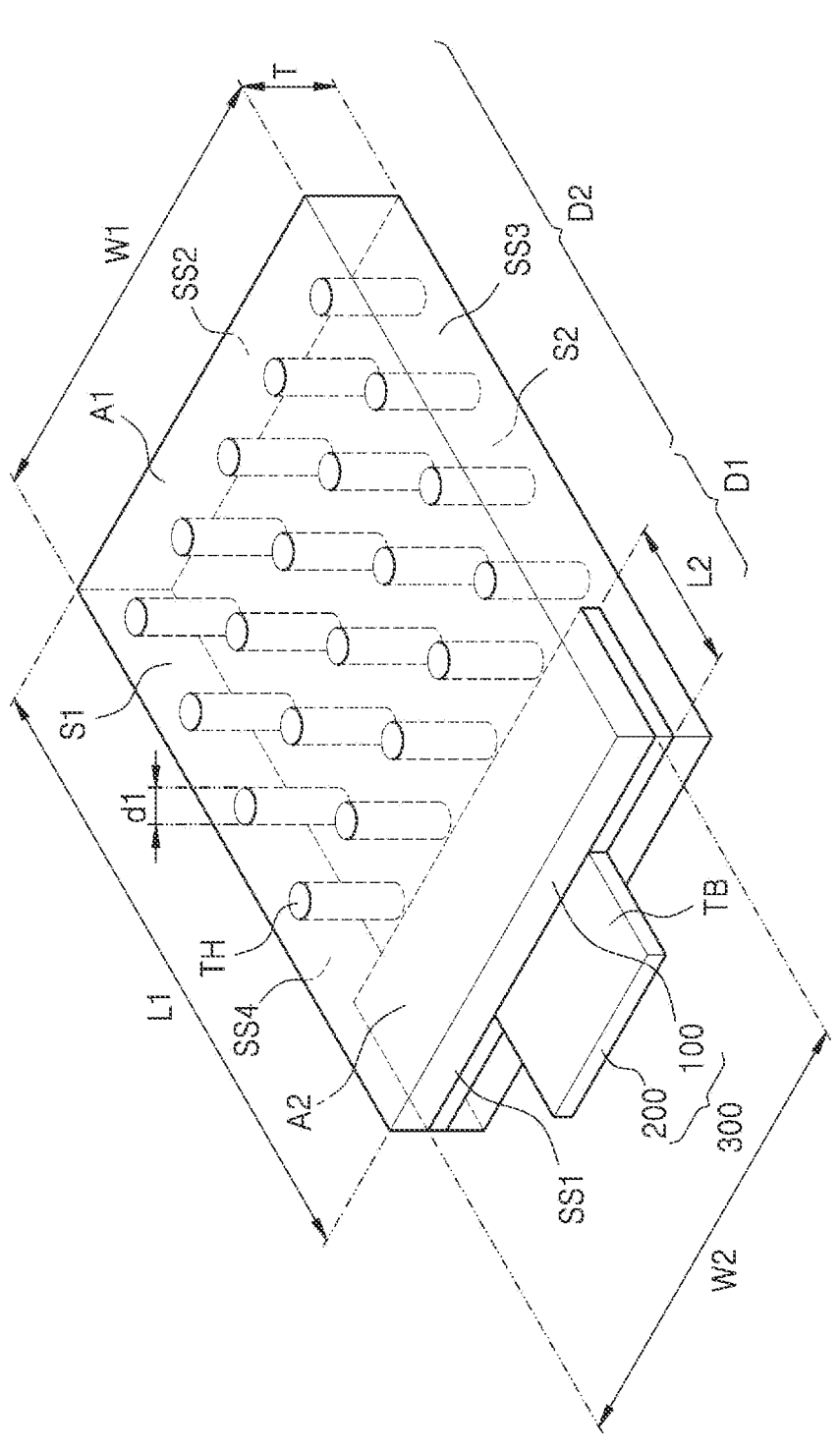
FIG. 5 is a schematic perspective view of an electrode according to one or more embodiments of the present disclosure.

Referring to FIG. 5, in an electrode 300 according to one or more embodiments, an electrode active material layer 100 includes a first surface (first inner side) S1 and a second surface (second inner side) S2 opposing (facing) the first surface S1, and also includes a first side surface (third inner side) SS1 connected at length-direction terminal ends of the first surface S1 and the second surface S2, and a second side surface (forth inner side) SS2 opposing the first side surface SS1, and further includes a third side surface (fifth inner side) SS3 connected at width-direction terminal ends of the first surface S1 and the second surface S2, and a fourth side surface (sixth inner side) SS4 opposing the third side surface SS3. A first domain D1 is a domain that is defined by the first surface S1, the second surface S2, the third side surface SS3, and the fourth side surface SS4, and includes an electrode current collector 200 disposed between the first surface S1 and the second surface S2. A second domain D2 is a domain that is defined by the first surface S1, the second surface S2, the third side surface SS3, and the fourth side surface SS4, and is free of the electrode current collector 200 between the first surface S1 and the second surface S2. The second domain D2 includes a plurality of through-holes TH having an arbitrary (or set or predetermined) diameter d1. The first domain D1 and the second domain D2 that the electrode 300 includes have substantially the same thickness T.

Figure 8:
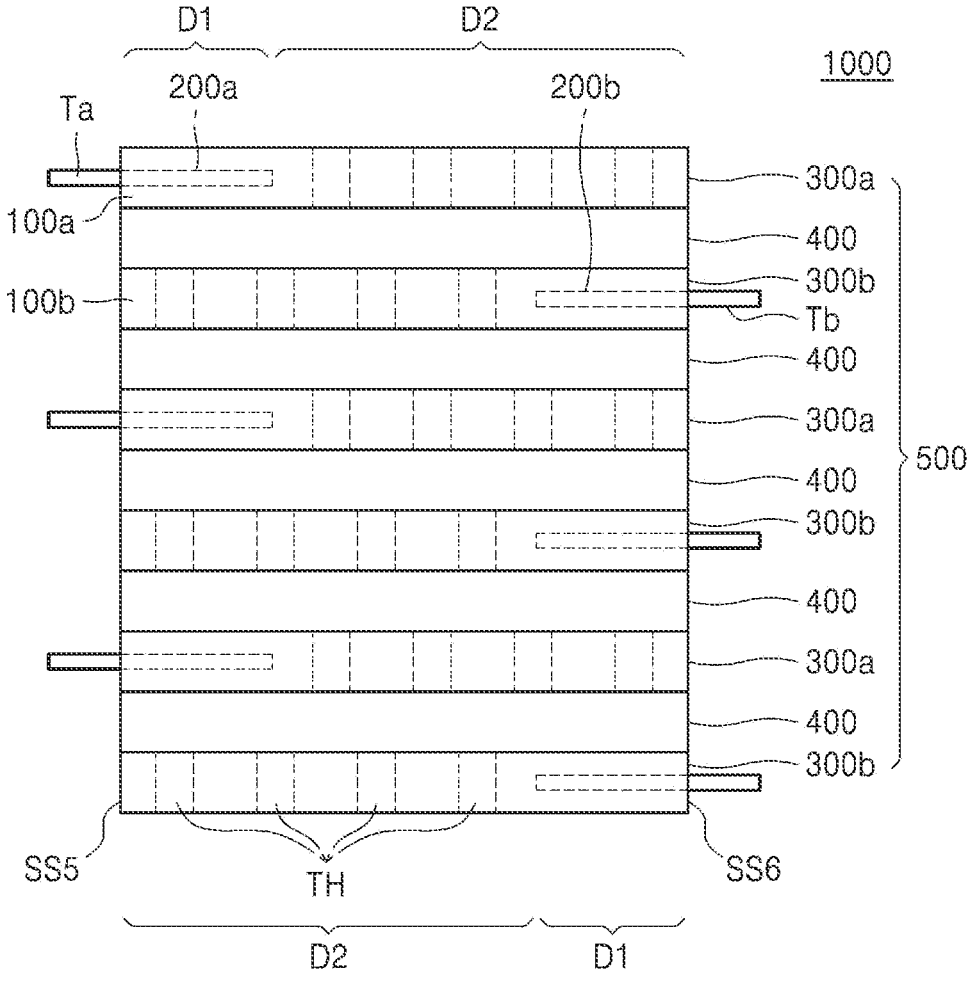
FIG. 8 is a side view of an electrode assembly according to one or more embodiments of the present disclosure.
Figure 9:
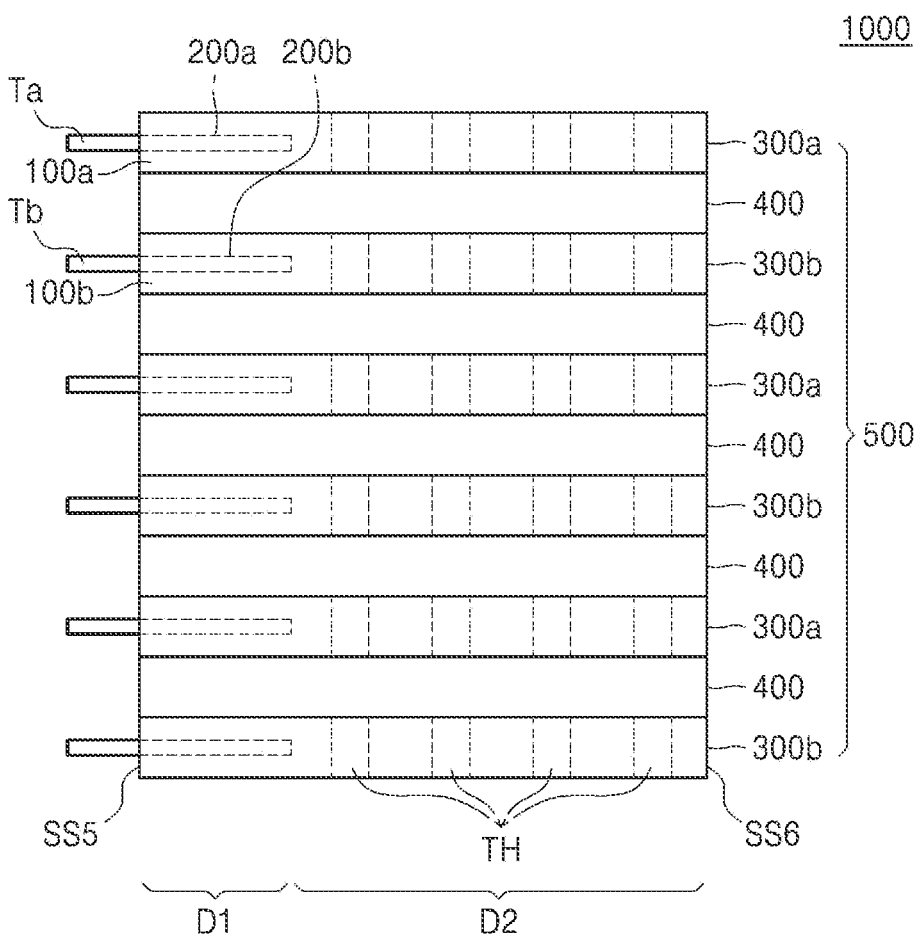
FIG. 9 is a side view of an electrode assembly according to one or more embodiments of the present disclosure.
Figure 10:
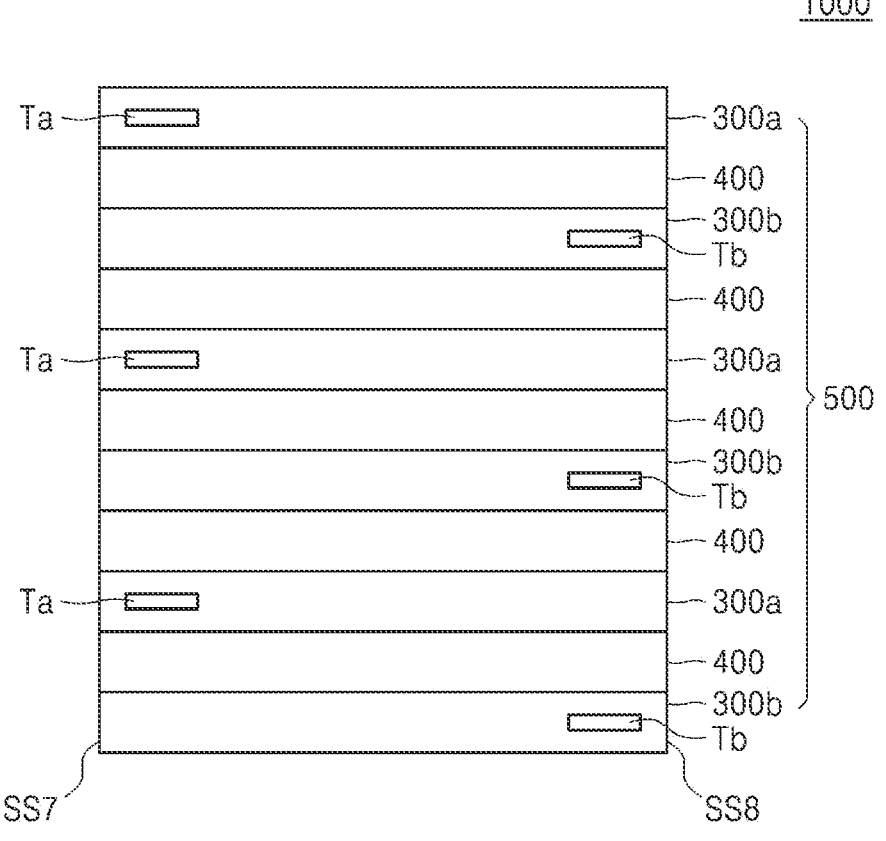
FIG. 10 is a front view of an electrode assembly of FIG. 9, according to one or more embodiments of the present disclosure.

Referring to FIG. 5, an electrode active material layer 100 has a first surface area A1 defined by a length direction first distance L1 and a width direction first distance W1, an electrode current collector 200 is disposed between a first surface S1 and a second surface S2, an electrode current collector 200 has a second surface area (A2) defined by a length direction second distance L2 and a width direction second distance W2, and the second surface area A2 is 90% or less of the first surface area A1 of the electrode active material layer 100. For example, the second surface area A2 of the electrode current collector 200 is from about 1% to about 90%, from about 5% to about 80%, from about 10% to about 70%, from about 10% to about 60%, from about 10% to about 50%, from about 10% to about 40%, from about 10% to about 30%, or from about 10% to about 20%, of the first surface area (A1) of the electrode active material layer 100. As the electrode current collector 200 in the electrode 300 is less in surface area than the electrode active material layer 100, a lithium battery 1000, for example, as shown in FIGS. 8 to 10, including the electrode 300 has a further improved energy density.

Referring to FIG. 5, the length direction second distance L2 of the electrode current collector 200 is 90% or less, 80% or less, 70% or less, 60% or less, 50% or less, 40% or less, 30% or less, or 20% or less, of the length direction first distance L1 of the electrode active material layer 100. For example, the length direction second distance L2 of the electrode current collector 200 is about 1% to about 90%, about 5% to about 80%, about 10% to about 70%, about 10% to about 60%, about 10% to about 50%, about 10% to about 40%, about 10% to about 30%, or about 10% to about 20%, of the length direction first distance L1 of the electrode active material layer 100. In one or more embodiments, the width direction second distance W2 of the electrode current collector 200 is 100% or less, 90% or less, 80% or less, 70% or less, 60% or less, 50% or less, 40% or less, 30% or less, or 20% or less, of the width direction first distance W1 of the electrode active material layer 100. For example, the width direction second distance W2 of the electrode current collector 200 is about 1% to about 100%, about 5% to about 90%, about 10% to about 80%, about 10% to about 70%, about 10% to about 60%, about 10% to about 50%, about 10% to about 40%, about 10% to about 30%, or about 10% to about 20%, of the width direction first distance W1 of the electrode active material layer 100. For example, the length direction second distance L2 of the electrode current collector 200 is 90% or less, or 50% or less of the length direction first distance L1 of the electrode active material layer 100, and the width direction second distance W2 of the electrode current collector 200 is 90% or less, or 50% or less of the width direction first distance W1 of the electrode active material layer (100). As the electrode current collector 200 has such a size, a lithium battery 1000, for example, as shown in FIGS. 8 to 10, including the electrode 300 has a further improved energy density.

Referring to FIG. 5, the electrode current collector 200 is exposed on at least three side surfaces from among a first side surface SS1, a second side surface SS2, a third side surface SS3 and a fourth side surface SS4 that the electrode active material layer 100 includes. The electrode current collector 200, as it has a surface area smaller than the electrode active material layer 100, is exposed on a portion of side surfaces, for example, three, two, or one side surface included in the electrode active material layer 100. As the number of side surfaces of the electrode active material layer 100 on which the electrode current collector 200 is exposed decreases, the likelihood of shorts caused through a side surface of the electrode active material layer 100 is reduced, thus improving reliability of the lithium battery 1000.

Referring to FIG. 5, the electrode current collector 200 further includes a tab TB extending out of the electrode active material layer 100 through at least one side surface including (e.g., selected from among) the first side surface SS1, the second side surface SS2, the third side surface SS3, and/or the fourth side surface SS4. For example, the tab (TB) extends out of the electrode active material layer 100 through the first side surface SS1 and/or the second side surface SS2. In one or more embodiments, the tab (TB) extends out of the electrode active material layer 100 through the third side surface SS3 and/or the fourth side surface SS4. As the tab TB extends out of the electrode active material layer 100 through one side surface, or two side surface opposing each other, shorts caused by multiple adjacent tabs TB can be prevented or reduced.

Referring to FIGS. 6A to 6F, the electrode current collector 200 disposed in (or on) a portion between opposing sides of the electrode active material layer (e.g., a portion of the electrode active material layer 100 is on opposite sides of the electrode current collector 200) (100) has one or more suitable forms and can be disposed in one or more suitable positions within the electrode active material layer 100. Referring to FIGS. 6A to 6F, in an electrode active material layer 100 defined by a first side surface SS1, a second side surface SS2, a third side surface SS3, and a fourth side surface SS4, the domain in which an electrode current collector 200 is disposed corresponds to a first domain, and the domain in which the electrode current collector 200 is not disposed corresponds to a second domain D2. The electrode active material layer 100 includes a plurality of through-holes TH having an arbitrary (or set or predetermined) diameter d1. A first domain D1 is a domain that includes the electrode active material layer 100 and the electrode current collector 200 disposed on one side or between opposing sides of the electrode active material layer 100. For example, the first domain D1 is a domain that includes the electrode current collector 200 and the electrode active material layer 100 disposed in an electrode thickness direction on one side or opposite sides of the electrode current collector 200. A second domain D2 is a domain that includes the electrode active material layer 100 and is free of the electrode current collector 200 disposed on one side, or between opposing sides of the electrode active material layer 100. For example, the second domain D2 is the remaining domain of the electrode active material layer 100, except the first domain D1.

Figure 6A:
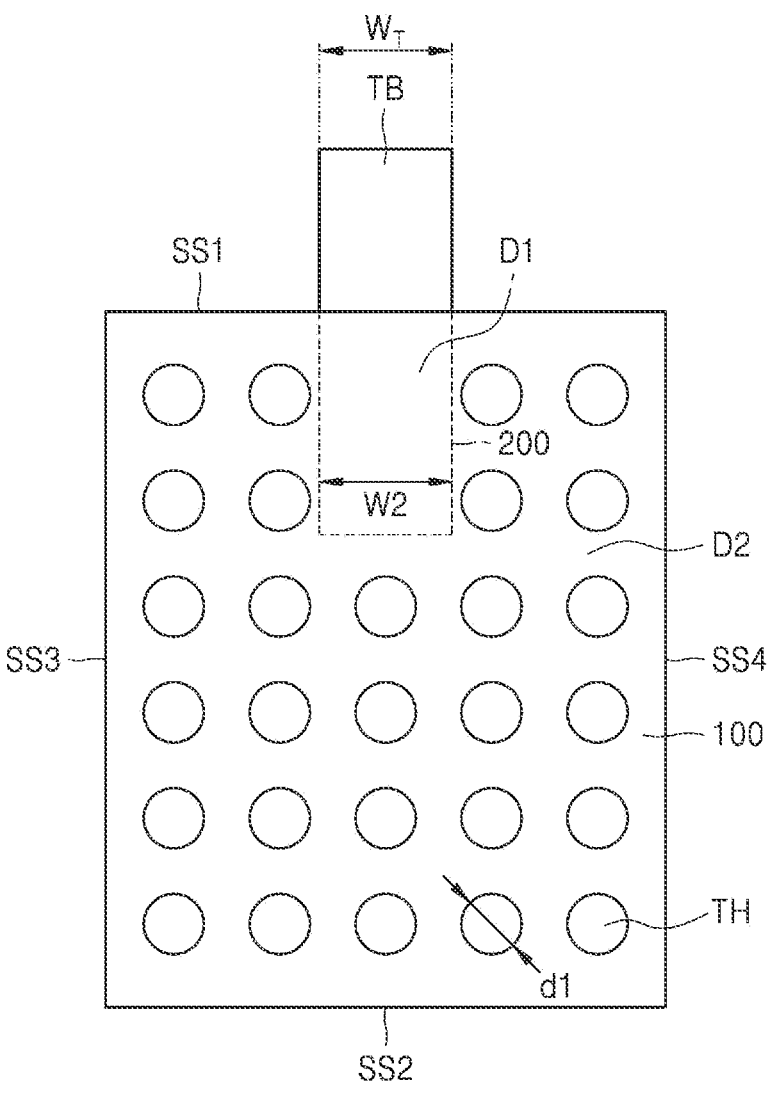
FIGS. 6A-6F are plan views of an electrode according to one or more embodiments of the present disclosure.

Referring to FIG. 6A, the electrode current collector 200 is disposed in (or on) a portion of the electrode active material layer 100 defined by the first side surface SS1, the second side surface SS2, the third side surface SS3, and the fourth side surface SS4. The electrode current collector (200 is exposed on the first side surface SS1 of the electrode active material layer100, and includes a tab TB extending out of the electrode active material layer 100 through the first side surface SS1. A width direction distance WT of the tab TB is 100% of a width direction second distance W2 of the electrode current collector 200.

Figure 6B:
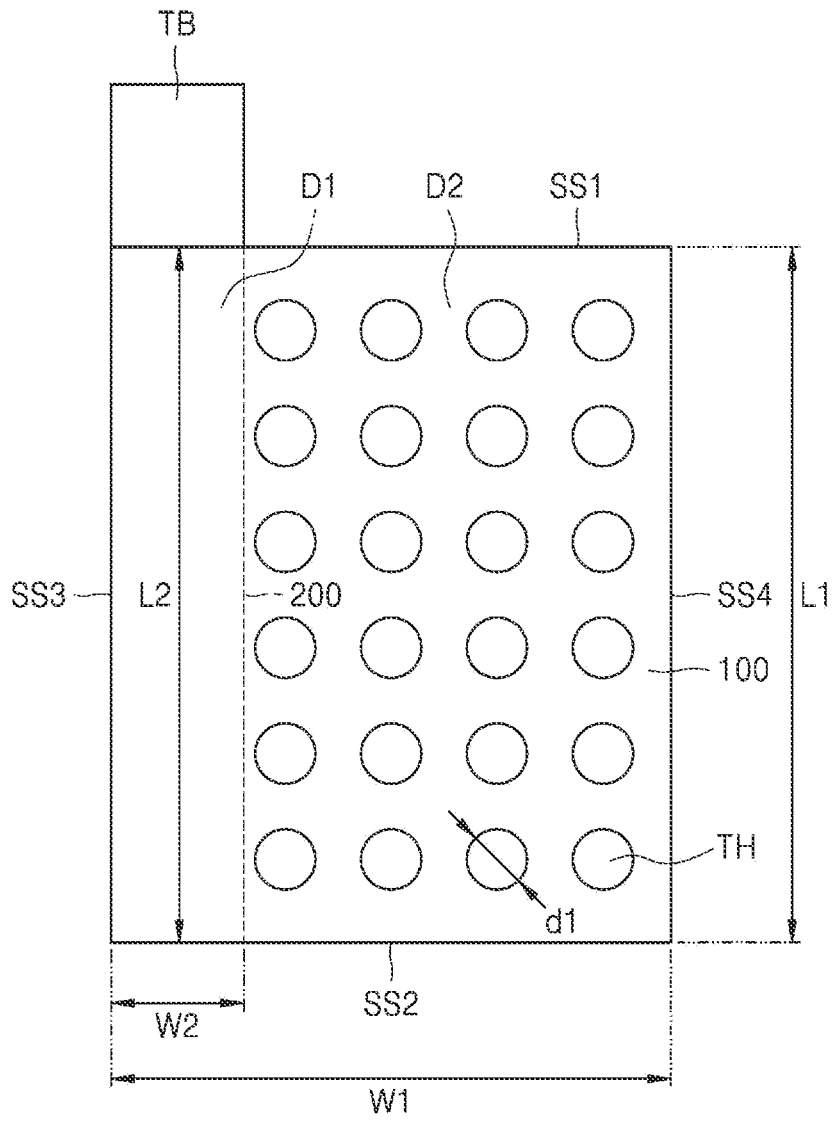

Referring to FIG. 6B, the electrode current collector 200 is disposed in a portion of the electrode active material layer 100 defined by the first side surface SS1, the second side surface SS2, the third side surface SS3, and the fourth side surface SS4. The electrode current collector 20) is exposed on the first side surface SS1, the second side surface SS2, and the third side surface SS3 of the electrode active material layer 100 and includes a tab (TB) extending out of the electrode active material layer 100 through the first side surface SS1. A length direction second distance L2 of the electrode current collector 200 is 100% of a length direction first distance L1 of the electrode active material layer 100. The width direction second distance W2 of the electrode current collector 200 is less than 100% of a width direction first distance W1 of the electrode active material layer 100.

Figure 6C:
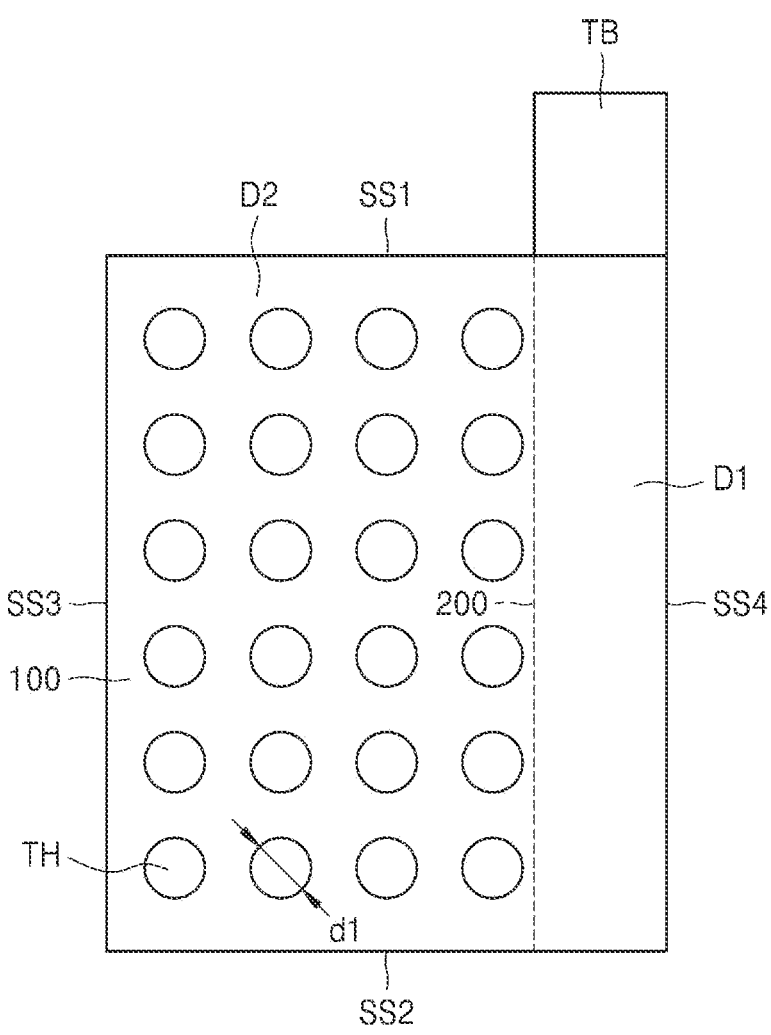

Referring to FIG. 6C, the electrode current collector 200 is disposed in a portion of the electrode active material layer 100 defined by the first side surface SS1, the second side surface SS2, the third side surface SS3, and the fourth side surface SS4. The electrode current collector 200 is exposed on the first side surface SS1, the second side surface SS2, and the fourth side surface SS4 of the electrode active material layer 100, and includes a tab TB extending out of the electrode active material layer 100 through the first side surface SS1.

Figure 6D:
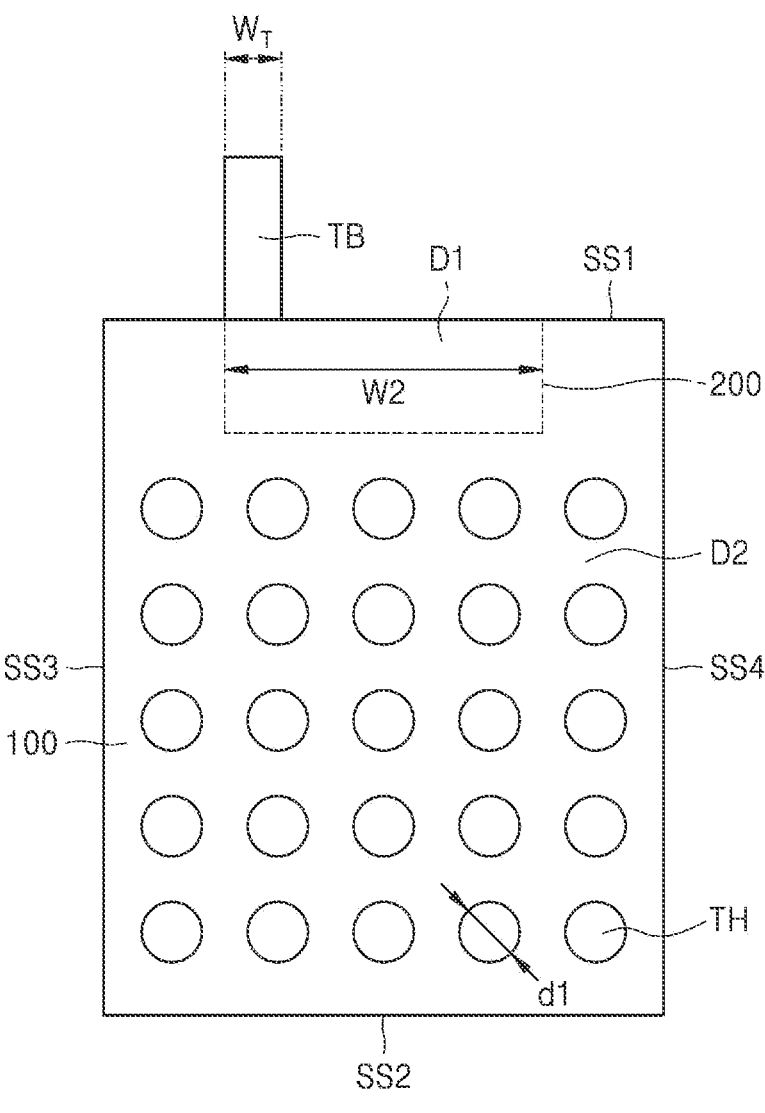

Referring to FIG. 6D, the electrode current collector 200 is disposed in a portion of the electrode active material layer 100 defined by the first side surface SS1, the second side surface SS2, the third side surface SS3, and the fourth side surface SS4. The electrode current collector 200 is exposed on the first side surface SS1 of the electrode active material layer 100, and includes a tab TB extending out of the electrode active material layer 100 through the first side surface SS1. A width direction distance WT of the tab TB is less than 100% of a width direction second distance W2 of the electrode current collector 200.

Figure 6E:
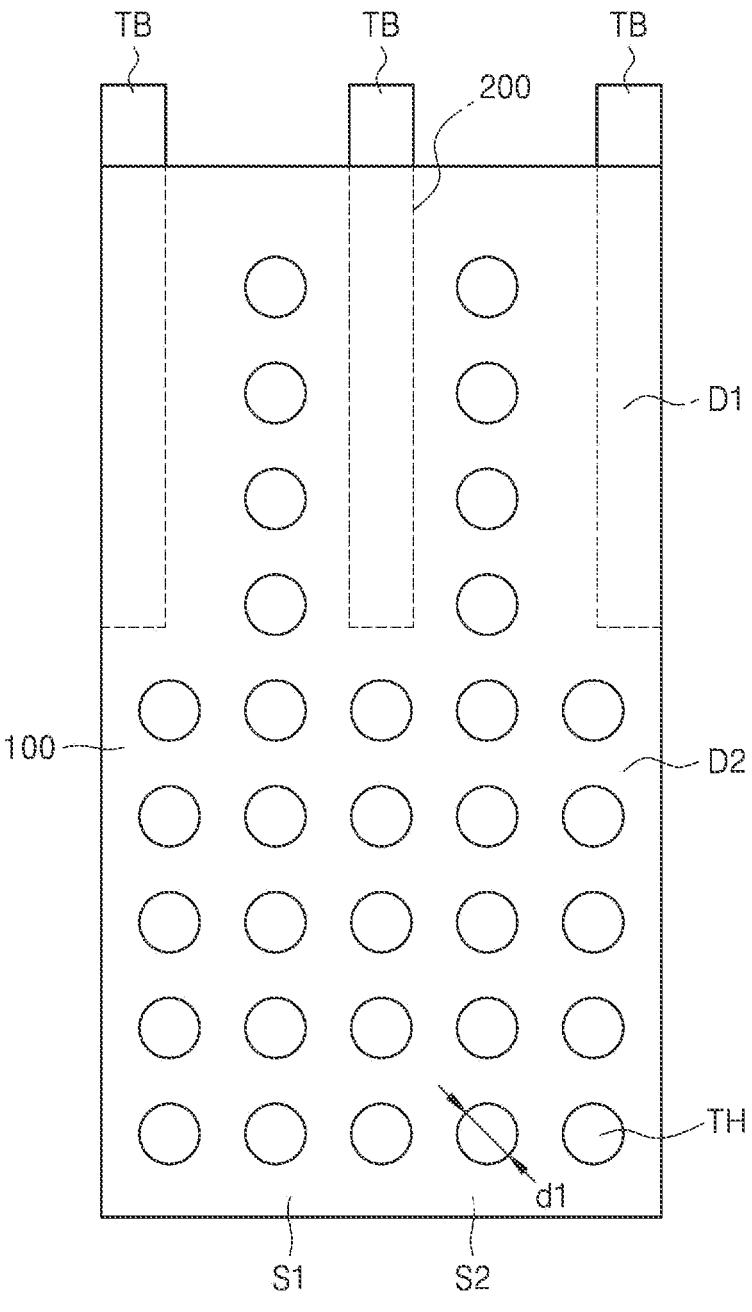
Figure 6F:
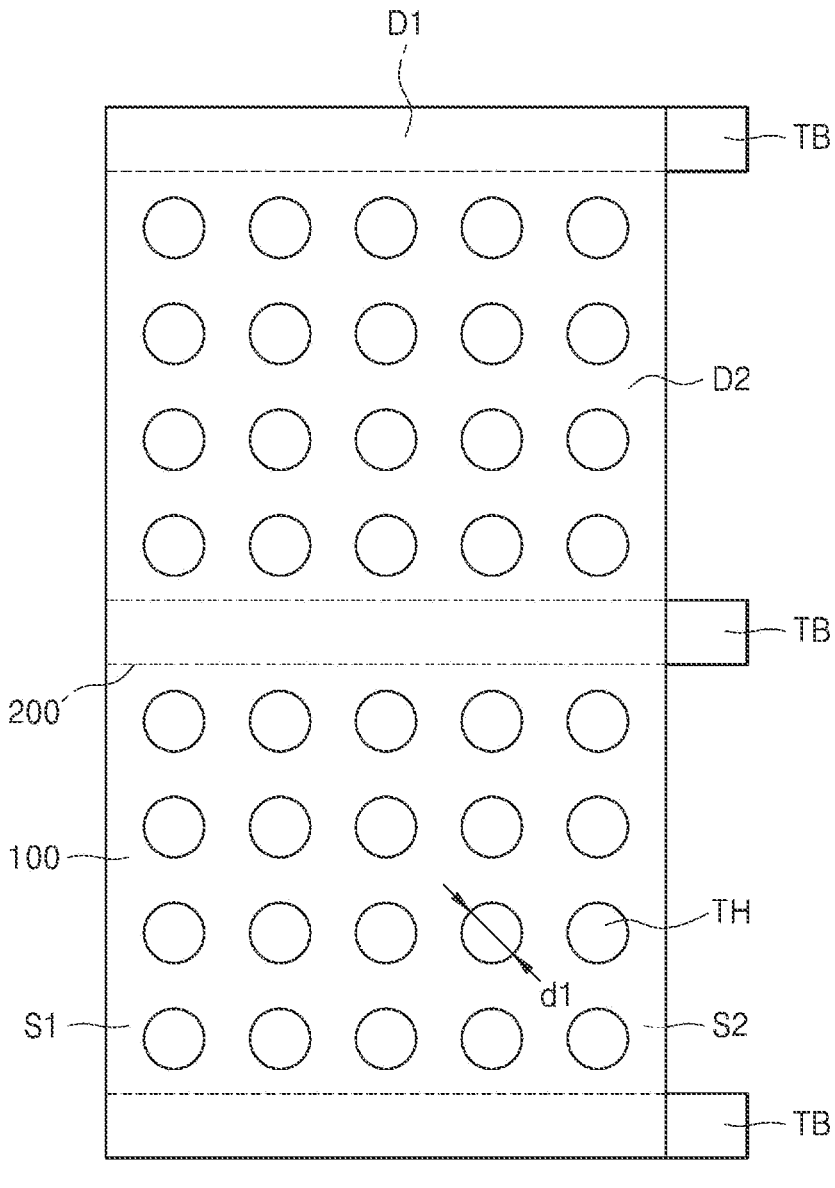

Referring to FIG. 6E and FIG. 6F, a plurality of electrode current collectors 200 are disposed in portions of an electrode active material layer 100 defined by a first side surface SS1, a second side surface SS2, a third side surface SS3, and a fourth side surface SS4. The plurality of electrode current collectors 200 spaced apart from one another along a length direction or width direction of the electrode active material layer 100 are included. The plurality of electrode current collectors 200 are, for example, evenly spaced apart from one another, or unevenly spaced apart from one another. The plurality of electrode current collectors 200 form (e.g., have an angle of) 50 degrees or less, 40 degrees or less, 30 degrees or less, 25 degrees or less, 20 degrees or less, 15 degrees or less, 10 degrees or less, or 5 degrees or less, with one side of the electrode active material layer 100, for example, at least one of a first surface S1 or a second surface S2. For example, the plurality of electrode current collectors 200 form 0 degrees with one side of the electrode active material layer 100, that is, are disposed parallel thereto. The plurality of electrode current collectors 200 are, for example, disposed between the first surface S1 and the second surface S2 of the electrode active material layer 100.

Figure 7:
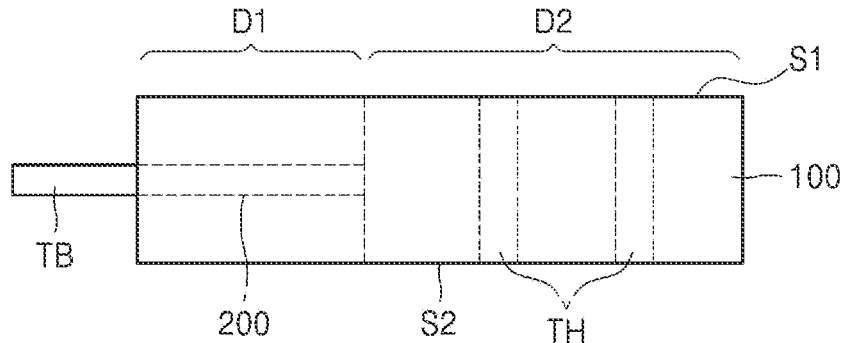
FIG. 7 is a cross-sectional view of another electrode according to one or more embodiments of the present disclosure.

Referring to FIG. 7, an electrode active material layer 100 includes: a first domain D1 in which an electrode current collector 200 is disposed between a first surface S1 and a second surface S2; and a second domain D2 in which the electrode current collector 200 is not disposed between the first surface S1 and the second surface S2. The electrode current collector 200 includes a tab TB.

According to one or more embodiments, a lithium battery includes: a cathode; an anode; and an electrolyte disposed between the cathode and the anode, wherein at least one of the cathode and the anode is the electrode described above.

Referring to FIGS. 8 to 10, a lithium battery 1000 includes: a cathode 300*a*; an anode 300*b*; and an electrolyte 400 disposed between the cathode 300*a* and the anode 300*b*, wherein at least one of the cathode 300*a* and the anode 300*b* is the electrode described above. The lithium battery 1000 includes an electrode assembly 500. A second domain D2 that the cathode 300*a* and/or the anode 300*b* include includes a plurality of through-holes TH having an arbitrary diameter d1. A first domain D1 does not include through-holes TH.

Referring to FIG. 8, the electrode assembly 500 includes: a plurality of cathodes 300*a* stacked in a thickness direction; a plurality of anodes 300*b*, each disposed between the plurality of cathodes 300*a*; and a plurality of electrolytes 400, each disposed between the plurality of cathodes 300*a* and anodes 300*b*. The cathode 300*a* includes a cathode current collector 200*a*, the cathode current collector 200*a* includes a cathode tab Ta extending out of a cathode active material layer 100*a* through one side surface SS5 of the electrode assembly 500, the anode 300*b* includes an anode current collector 200*b*, and the anode current collector 200*b* includes an anode tab Tb extending out of an anode active material layer 100*b* through the other side surface SS6 opposing the one side surface SS5 of the electrode assembly 500. A lithium battery 1000 includes the electrode assembly 500. Because the cathode tab Ta and the anode tab Tb are disposed on side surfaces opposing each other, the likelihood of shorts occurring between these two is reduced.

Referring to FIG. 9, the electrode assembly 500 includes: a plurality of cathodes 300*a* stacked in a thickness direction; a plurality of anodes 300*b*, each disposed between the plurality of cathodes 300a; and a plurality of electrolytes 400, each disposed between the plurality of cathodes 300a and anodes 300b. The cathode 300a includes a cathode current collector 200a, the cathode current collector 200a includes a cathode tab Ta extending out of a cathode active material layer 100a through one side surface SS5 of the electrode assembly 500, the anode 300b includes an anode current collector 200b, and the anode current collector 200b includes an anode tab Tb extending out of an anode active material layer 100b through the same side surface SS5 of the electrode assembly 500. A lithium battery 1000 includes the electrode assembly 500.

Referring to FIG. 10, on one side surface SS5, a plurality of cathode tabs Ta are evenly spaced apart from one another in a thickness direction, and a plurality of anode tabs Tb are evenly spaced apart from one another in the thickness direction. The plurality of cathode tabs Ta are disposed adjacent to one side surface SS7 in a width direction of an electrode assembly 500, and the plurality of anode tabs Tb are disposed adjacent to the other side surface SS8 in the width direction of the electrode assembly 500. FIG. 10 is a front view of one side surface SS5 of FIG. 9. A lithium battery 1000 includes an electrode assembly 500.

A cathode tab Ta and an anode tab Tb are disposed on the same side surface, but because they are spaced apart from each other in a width direction, the likelihood of shorts occurring between these two is reduced.

In one or more embodiments, an electrode assembly may include: a plurality of cathodes stacked in a thickness direction; a plurality of anodes, each disposed between the plurality of cathodes; and a plurality of electrolytes, each disposed between the plurality of cathodes and anodes, as one or more cathodes and/or anodes containing a plurality of through-holes are formed between cathodes and/or anodes not containing a plurality of through-holes, the cathodes and/or anodes containing the plurality of through-holes function as an ion conducting layer or an ion conducting channel of a sort, and thus, cycle characteristics, such as high rate capability, of a lithium battery including the electrode assembly can be improved.

The lithium battery (1000) is, for example, a lithium ion battery, a lithium solid battery, a lithium air battery, and/or the like.

Provided is an electrode preparation method according to one or more embodiments.

According to one or more embodiments, the electrode preparation method includes: preparing a mixture by dry mixing an electrode active material, a dry conductive material, and a dry binder; providing an electrode current collector; preparing an electrode including an electrode active material layer disposed on one side or opposite sides of the electrode current collector, by placing and rolling the mixture on the one side or opposite sides of the electrode current collector; and introducing a plurality of through-holes into the electrode active material layer, wherein the introduction of the plurality of through-holes is carried out at the same time as the rolling, or subsequent to the rolling.

An electrode prepared by the preparation method above has an improved uniformity of substantially uniform adhesion distribution within the electrode, and thus, a lithium battery employing such an electrode has improved performance. In one or more embodiments, in an electrode prepared by the preparation method above, as an electrode current collector is disposed in a portion inside the electrode, and an electrode active material layer in a domain in which the electrode current collector is not disposed includes a plurality of through-holes, a lithium battery employing such an electrode has improved cycle characteristics.

First, a mixture is prepared by dry mixing an electrode active material, a dry conductive material, and a dry binder. The dry mixing refers to mixing in a state free of processing solvent. The processing solvent is, for example, a solvent utilized in manufacturing an electrode slurry. The processing solvent is, for example, water, N-Methylpyrrolidone (NMP), and/or the like, but is not limited thereto, and may be any processing solvent that is utilized in manufacturing of electrode slurry. The dry mixing may be carried out utilizing a mixer, and for example, at a temperature of about 25° C. to about 65° C. The dry mixing may be carried out utilizing a mixer, and for example, at a rotation rate of about 10 rpm to about 10,000 rpm, or about 100 rpm to about 10,000 rpm. The dry mixing may be carried out utilizing a mixer, for example, for about 1 minute to about 200 minutes, or about 1 minute to about 150 minutes.

The dry mixing may be carried out one or more times, for example. First, a first mixture may be prepared by first dry mixing of an electrode active material, a dry conductive material, and a dry binder. The first dry mixing may be carried out, for example, at a temperature of about 25° C. to about 65° C., at a rotation rate of 2,000 rpm or less, and for a duration of 15 minutes or less. The first dry mixing may be carried out, for example, at a temperature of about 25° C. to about 65° C., at a rotation rate of about 500 rpm to about 2,000 rpm, and for a duration of about 5 minutes to about 15 minutes. The electrode active material, the dry conductive material, and the dry binder may be uniformly mixed by the first dry mixing. Subsequently, a second mixture may be prepared by second dry mixing of an electrode active material, a dry conductive material, and a dry binder. The second dry mixing may be carried out, for example, at a temperature of about 25° C. to about 65° C., at a rotation rate of 4,000 rpm or more, and for a duration of 10 minutes or more. The second dry mixing may be carried out, for example, at a temperature of about 25° C. to about 65° C., at a rotation rate of about 4,000 rpm to about 9,000 rpm, and for a duration of about 10 minutes to about 60 minutes. By the second dry mixing, a dry mixture including a fibrillated dry binder may be obtained.

The mixer is, for example, a kneader. The mixer includes, for example: a chamber; at least one rotating shaft disposed and rotated inside the chamber; and a blade rotatably coupled to the rotating shaft and disposed in a length direction of the rotating shaft. The blade may be, for example, at least one of (e.g., one selected from among) a ribbon blade, a sigma blade, a Z blade, a dispersing blade, and/or a screw blade. By including the blade, the electrode active material, the dry conductive material, and the dry binder can be effectively mixed even without solvent, to produce a dough-like mixture.

The produced mixture may be introduced into an extruder apparatus and extruded into a sheet form. The pressure for extrusion is, for example, about 4 MPa to about 100 MPa, or about 10 MPa to about 90 MPa. The mixture thus obtained may be a sheet form. For example, the mixture thus obtained may be an electrode active material layer.

The dry conductive material may include, but is not limited to: carbon black, graphite particles, natural graphite, artificial graphite, acetylene black, Ketjenblack®, and carbon fibers; carbon nanotubes; metal powder, metal fibers, or metal tubes of copper, nickel, aluminum, silver, and/or the like; and a conductive polymer such as a polyphenylene derivative. Any conductive material utilized in the relevant technical field may be utilized. The conductive material is, for example, a carbon-based conductive material. Further details on the dry conductive material are provided in the descriptions of the electrode above.

The dry binder may be a vinylidene fluoride/hexafluoropropylene copolymer, polyvinylidene fluoride, polyacrylonitrile, polymethyl methacrylate, polytetrafluoroethylene (PTFE), a mixture of the aforementioned polymers, a styrene butadiene rubber-based polymer. For a solvent, N-methylpyrrolidone (NMP), acetone, water, and/or the like may be utilized but is not limited thereto. Any suitable material that is utilized in the relevant technical field may be utilized. Further details on the dry binder are provided in the descriptions of the electrode above.

It is also possible to create pores inside an electrode plate by further adding a plasticizer and a pore forming agent to an electrode active material composition.

The amounts of the electrode active material, the dry conductive material, and the dry binder utilized in the electrode active material layer are further described in the description of the electrode above.

A cathode utilizes a cathode active material as an electrode active material. The cathode active material is further described in the description of the electrode above. An anode utilizes an anode active material as an electrode active material. The anode active material is further described in the description of the electrode above.

Next, an electrode current collector is provided.

The electrode current collector may further include an interlayer disposed on one side or opposite sides of the electrode current collector. Further details on the interlayer are provided in more detail in the descriptions of the electrode above.

The preparation of the electrode current collector may further include, for example, placing an interlayer on one side or opposite sides of the electrode current collector.

The material of the electrode current collector is further described in the description of the electrode current collector above. A cathode current collector is, for example, an aluminum foil. An anode current collector is, for example, a copper foil.

The placement of a coating layer on one side or an upper side of the electrode current collector involves coating an interlayer on one side or opposite sides of the electrode current collector by a dry or wet coating method. Specific coating methods are further described in the description of the electrode current collector including an interlayer, provided above.

Next, an electrode including an electrode active material layer disposed on one side or opposite sides of the electrode current collector is prepared by placing and rolling the mixture on the one side or opposite sides of the electrode current collector. The rolling may be carried out by, for example, a press roll, a plate roll, and/or the like, but is not limited thereto. The pressure for the rolling is, for example, about 1.0 ton/cm to about 10.0 ton/cm. An excessively increasing pressure for the rolling may result in cracks in a thin film electrode current collector. Too low a pressure for the rolling may result in a low adhesion between the electrode current collector and the electrode active material layer.

Next, the introduction of a plurality of through-holes in the electrode active material layer is included.

The introduction of a plurality of through-holes is carried out at the same time as the rolling, or subsequent to the rolling.

For example, once an electrode having an electrode active material layer disposed on one side or opposite sides of an electrode current collector is prepared, a plurality of through-holes may be introduced into the electrode active material layer. As illustrated in FIGS. 1A to 2B, the plurality of through-holes TH may be formed in a second domain D2 in which the electrode current collector 200 is not disposed. The method of introducing the through-holes may be punching and/or the like, but is not limited thereto, and may be any method and/or device in the relevant technical field that are capable of introducing through-holes.

In one or more embodiments, in the process of preparing the electrode having the electrode active material layer disposed on one side or opposite sides of the electrode current collector, it is possible to introduce a plurality of through-holes into the electrode active material layer at the same time as rolling, by utilizing a rolling roller including a plurality of bumps formed on a surface thereof. As illustrated in FIGS. 1A to 2B, the plurality of through-holes TH may be formed in a second domain D2 in which the electrode current collector 200 is not disposed. The method of introducing through-holes into the electrode active material layer during an electrode preparation process is not limited to the utilize of a rolling roller including bumps formed on a surface thereof, and may be any method and/or device in the relevant technical field that are capable of introducing through-holes.

A lithium battery is prepared by, for example, an example method described in more detail below, but is not limited thereto, and may vary depending on the conditions required.

First, one of a cathode and an anode, or both, may be prepared according to the electrode preparation method described above. In one or more embodiments, in a case in which one electrode of the cathode and the anode is prepared by the electrode preparation process described above, the other electrode may be prepared by a wet-type or kind preparation method. For example, the other electrode may be prepared by preparing an electrode slurry containing an electrode active material, a conductive material, a binder, and a solvent, and then coating and drying the prepared electrode slurry on an electrode current collector. The conductive material and the binder that an electrode prepared by a wet-type or kind method includes may be selected from among conductive materials and binders utilized in the preparation of a dry-type or kind electrode described in more detail above.

Next, a separator to be inserted between the cathode and the anode is prepared.

The separator may be any one that is commonly utilized in lithium batteries. The separator may be one that has excellent or suitable electrolyte retention capability while having low resistance to migration of ions in an electrolyte. Examples of the separator include at least one of glass fiber, polyester, Teflon, polyethylene, polypropylene, and polytetrafluoroethylene (PTFE), or a combination thereof, each of which may be in the form of a non-woven or a woven fabric. A windable separator including polyethylene, polypropylene, and/or the like may be utilized in a lithium ion battery, and a separator having excellent or suitable retention capability for an organic electrolyte solution may be utilized in a lithium-ion polymer battery.

The separator may be prepared by an example method provided herein, but is not strictly limited to such a method, and may be adjusted depending on the conditions required.

First, a polymer resin, a filler, and a solvent are combined to prepare a separator composition. The separator composition is directly coated on an electrode and then dried to form a separator. In one or more embodiments, the separator composition may be cast on a support and dried, and then a separator film detached from the support may be laminated on an upper portion of the electrode, thereby forming a separator.

The polymer utilized in preparing the separator is not particularly limited, and may be any polymer that is utilized as an adhesive material of electrode plates. Examples of the polymer include a vinylidenefluoride/hexafluoropropylene copolymer, polyvinylidenefluoride (PVDF), polyacrylonitrile, polymethylmethacrylate, or a mixture thereof, and/or the like.

Next, an electrolyte is prepared.

The electrolyte may be, for example, an organic electrolyte solution. The organic electrolyte solution may be prepared by, for example, dissolving a lithium salt in an organic solvent.

Any suitable organic solvent utilized in the relevant technical field may be utilized for the organic solvent. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, $\gamma$-butyrolactone, dioxorane, 4-methyldioxorane, N,N-dimethyl formamide, dimethyl acetamide, dimethylsulfoxide, dioxolane, 1,2-dimethoxyethane, sulfolane, dichloroethane, chlorobenzene, nitrobenzene, diethylene glycol, dimethyl ether, or a mixture thereof.

For the lithium salt, any suitable lithium salt utilized in the relevant technical field may be utilized. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or a mixture thereof, and/or the like.

In one or more embodiments, the electrolyte may be a solid electrolyte. Examples of the solid electrolyte include boron oxides, lithium oxynitride, and/or the like, but are not limited thereto, and any solid electrolyte utilized as a solid electrolyte in the relevant technical field may be utilized. The solid electrolyte may be formed on an anode by, for example, a method such as sputtering, or in one or more embodiments, a separate solid electrolyte sheet is laminated on the anode. Examples of the solid electrolyte include an oxide-based solid electrolyte and a sulfide-based solid electrolyte.

Figure 11:
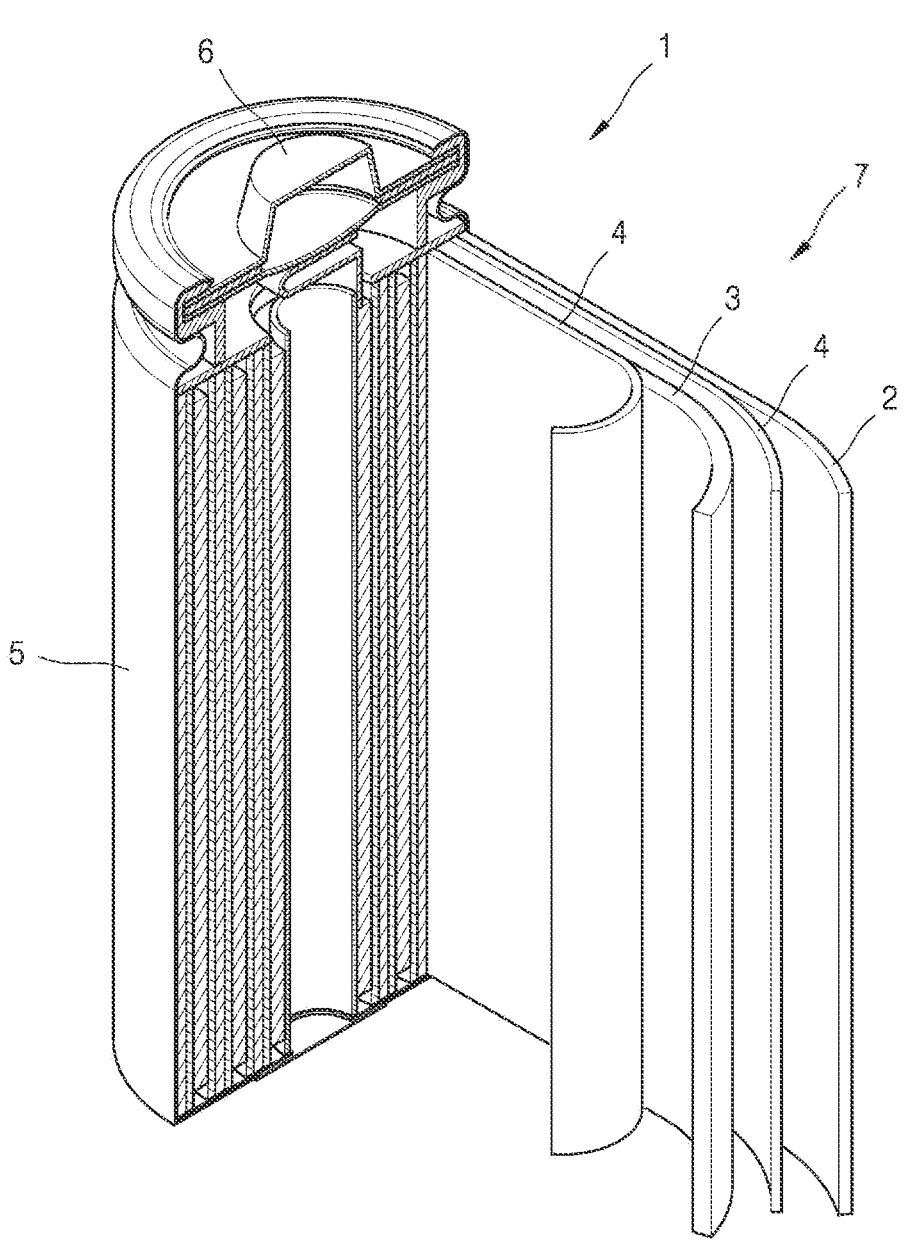
FIG. 11 is a schematic perspective view of a lithium battery according to one or more embodiments of the present disclosure.

Referring to FIG. 11, a lithium battery 1 according to one or more embodiments includes a cathode 3, an anode 2, and a separator 4. The cathode 3, the anode 2, and the separator 4 are wound or folded to form a battery assembly 7. The battery assembly 7 thus formed is disposed in a battery case 5. An organic electrolyte is injected into the battery case 5 and sealed by a cap assembly 6, thereby completing the lithium battery 1. The battery case 5 may be cylindrical, but is not particularly limited thereto, and may be for example, rectilinear or in the form of a thin film, and/or any other suitable form.

Figure 12:
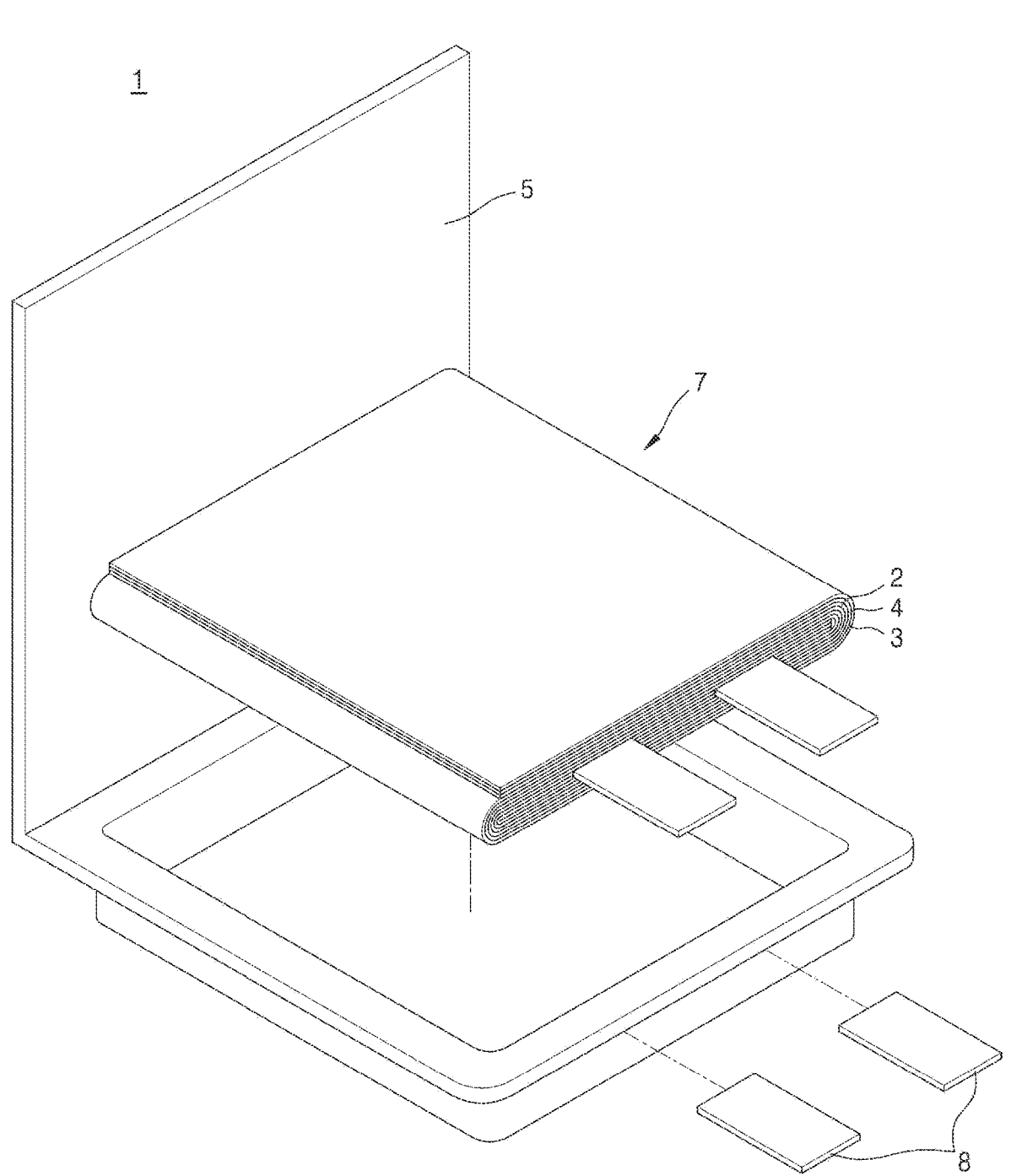
FIG. 12 is a schematic perspective view of a lithium battery according to one or more embodiments of the present disclosure.

Referring to FIG. 12, a lithium battery 1 according to one or more embodiments includes a cathode 3, an anode 2, and a separator 4. The separator 4 may be disposed between the cathode 3 and the anode 2, and the cathode 3, the anode 2, and the separator 4 may be wound or folded to form a battery assembly 7. The battery assembly 7 thus formed is disposed in a battery case 5. An electrode tab 8, which serves as an electric channel for guiding an electric current formed in the battery assembly 7 to the outside, may be included. An organic electrolyte is injected into the battery case 5 and sealed, thereby completing the lithium battery 1. The battery case 5 may be rectilinear, but is not particularly limited thereto, and may be, for example, cylindrical or in the form of a thin film, and/or any other suitable form.

Figure 13:
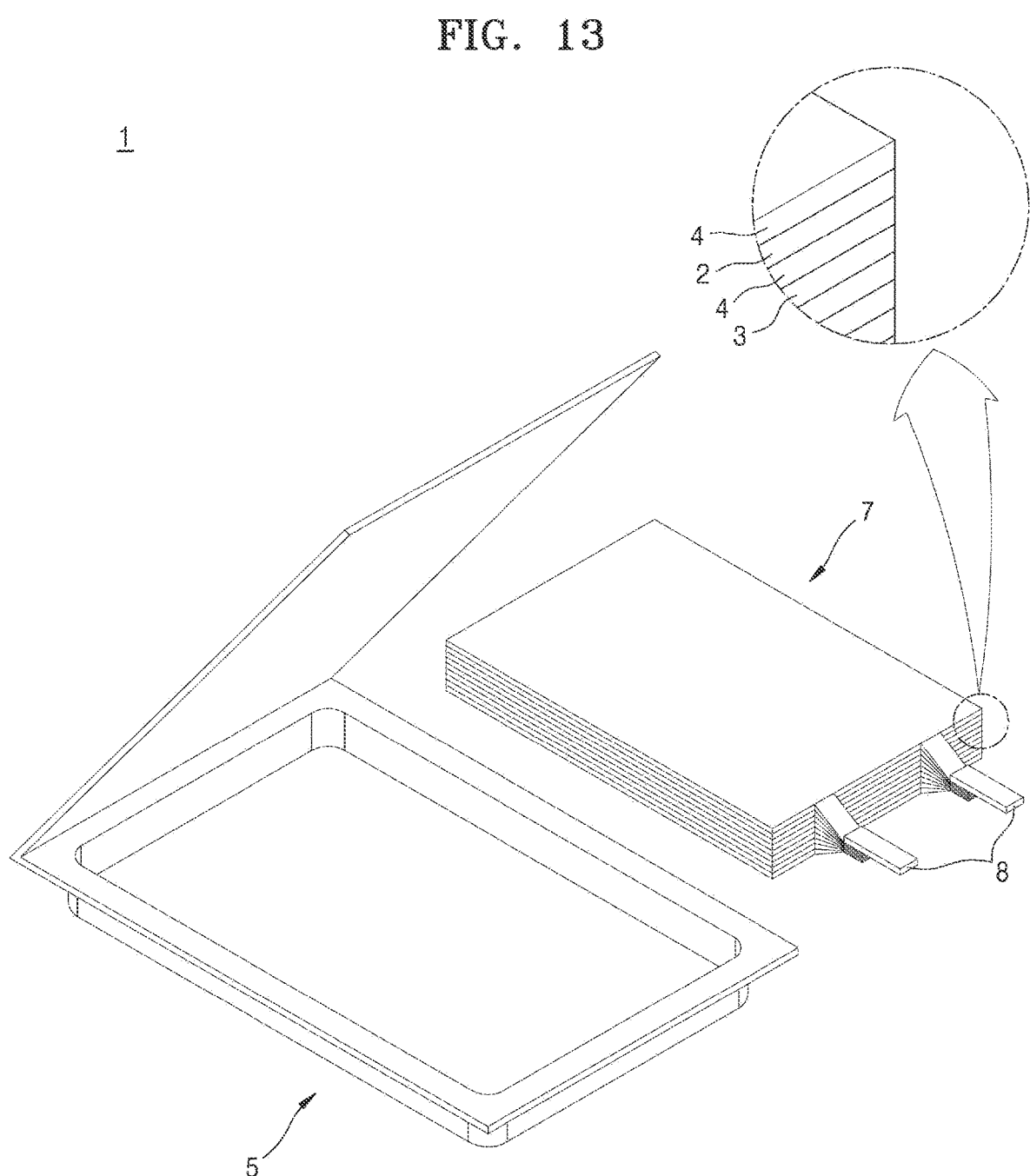
FIG. 13 is a schematic perspective view of a lithium battery according to one or more embodiments of the present disclosure.

Referring to FIG. 13, a lithium battery 1 according to one or more embodiments includes a cathode 3, an anode 2, and a separator 4. The separator 4 is disposed between the cathode 3 and the anode 2, thereby forming a battery assembly 7. The battery assembly 7 is stacked in a bi-cell structure and then disposed in a battery case 5. An electrode tab 8, which serves as an electric channel for guiding an electric current formed in the battery assembly 7 to the outside, may be included. An organic electrolyte is injected into the battery case 5 and sealed, thereby completing the lithium battery 1. The battery case 5 may be rectilinear, but is not particularly limited thereto, and may be, for example, cylindrical or in the form of a thin film, and/or any other suitable form.

A pouch-type or kind lithium battery corresponds to each of the lithium batteries of FIGS. 11 to 13, utilizing a pouch as a battery case. The pouch-type or kind lithium battery may include one or more battery assemblies. A separator may be disposed between a cathode and an anode, thereby forming a battery assembly. The battery assembly is stacked in a bi-cell structure and impregnated in an organic electrolyte solution, and then disposed and sealed in a pouch, thereby completing a pouch-type or kind lithium battery. For example, the cathode, the anode, and the separator described above may be simply stacked and disposed in a pouch in the form of an electrode assembly, or may be folded or wound into a jelly-roll type or kind electrode assembly and disposed in a pouch. Subsequently, an organic electrolyte solution may be injected into the pouch and sealed, thereby completing a lithium battery.

The lithium battery has excellent or suitable lifetime characteristics and high rate capability, and thus may be utilized, for example, in an electric vehicle (EV). For example, the lithium battery may be utilized in a hybrid vehicle, such as a plug-in hybrid electric vehicle (PHEV). In one or more embodiments, the lithium battery may be utilized in any field that requires the storage of a large quantity of power. For example, the lithium battery may be utilized in electric bicycles, powered tools, and/or the like.

Multiple units of the lithium battery may be stacked to form a battery module, and a plurality of such battery modules may form a battery pack. The resulting battery pack may be utilized in all types (kinds) of devices that require high capacity and high output. For example, the battery pack may be utilized in laptop computers, smart phones, EVs, and/or the like. The battery module may include, for example, a plurality of batteries and a frame that hold the batteries. The battery pack may include, for example, a plurality of battery modules, and a bus bar connecting the battery modules. The battery module and/or battery pack may further include a cooling device. A plurality of battery packs may be managed by a battery management system. The battery management system may include a battery pack and a battery control device connected to the battery pack.

The present disclosure is described in greater details through the embodiments (examples) and comparative examples. However, the following embodiments are for illustrative purpose only and shall not be construed as limiting the scope of the present disclosure.

Preparation of Lithium Battery (Half Cell)

Embodiment 1: Dry Cathode, Partial Placement of Current Collectors, and Multiple Through-Holes Preparation of Cathode Cathode active material $LiNi_{0.91}Co_{0.05}Al_{0.04}O_2$ (hereinafter, referred to as NCA91), a carbon conductive material (Denka Black), and polytetrafluoroethylene (PTFE) were introduced into a blade mixer in a weight ratio of 92:4:4 and subjected to first dry mixing at 1,000 rpm at 25° C. for 10 minutes, to prepare a first mixture in which the active material, the conductive material, and the binder were uniformly mixed.

Subsequently, in order to start fibrillization of the binder, the first mixture was additionally subjected to a second mixing at 5,000 rpm at 25° C. for 20 minutes, to prepare a second mixture. In preparing the first mixture and the second mixture, no additional solvent was utilized.

The prepared second mixture was introduced into an extruder and extruded, to prepare a cathode active material layer self-standing film in the form of a sheet. The pressure for extrusion was 50 MPa.

Using a laser puncher on the cathode active material layer self-standing film, a plurality of through-holes, which were spaced apart with a substantially uniform interval and thus regularly and periodically disposed, were formed.

The diameters of the through-holes were 1 μm, and the shapes of the through-hole were circular. The through-holes were formed in a vertical direction on a surface of the cathode active material layer self-standing film.

The proportion of the area occupied by the through-holes relative to the entire surface area of one side of the cathode active material layer was 1%.

On both sides of an aluminum thin film having a thickness of 12 μm, a cathode current collector having a carbon layer disposed thereon as a coating layer was prepared.

A composition containing a carbon conductive material (Denka® black) and polyvinylidene fluoride (PVDF) was coated and dried on the aluminum thin film, to prepare the carbon layer. The carbon layer disposed on one side of the aluminum thin film had a thickness of about 1 μm.

A laminate body in the structure of cathode active material layer/carbon layer/aluminum/carbon layer/cathode active material layer was prepared by placing a first cathode active material layer self-standing film, placing a cathode current collector on a portion of the first cathode active material layer self-standing film, and placing a second cathode active material layer self-standing film on the first cathode active material layer self-standing film that has the cathode current collector positioned in the portion thereof. The width of the cathode current collector was the same as the first cathode active material layer self-standing film, and the length of the cathode current collector was ¼ of the length of the first cathode active material layer self-standing film.

The prepared laminate body was rolled to produce a dry cathode having a substantially uniform thickness. The pressure for rolling was 3.0 ton/cm. The thickness of the dry cathode was 100 μm. The thickness of the dry cathode was measured utilizing a scanning electron microscope on a cross-section of the dry cathode.

The ratio (d1/T1) of diameter d1 of through-hole to thickness T1 of electrode active material layer was 0.01.

The prepared dry cathode had a cross-sectional structure as illustrated in FIG. 1B. The prepared cathode had a structure that includes a first domain D1 having a cathode current collector positioned between both sides of the cathode active material layer, and a second domain D2 not having the cathode current collector positioned between both sides of the cathode active material layer. A plurality of through-holes TH were disposed in the second domain D2, and no through-holes were disposed in the first domain D1.

Preparation of Coin Cell

A coin cell was prepared utilizing the cathode prepared above, lithium metal as a counter electrode, a PTFE separator, and as an electrolyte, a solution in which 1.3M $LiPF_6$ was dissolved in EC (ethylene carbonate)+EMC (ethylmethyl carbonate)+DMC (dimethyl carbonate) (3:4:3 volume ratio).

Embodiment 2: Dry Cathode, Partial Placement of Current Collectors, Multiple Through-Holes, Increase in Surface Area of Through-Holes A cathode was prepared in substantially the same process as described in Embodiment 1, except that the proportion of the surface area occupied by through-holes in the entire surface area of one side of the cathode active material layer was increased to 5%.

Preparation of Coin Cell

A coin cell was prepared in substantially the same process as described in Embodiment 1, except that the cathode described above with respect to Embodiment 2 was utilized.

Embodiment 3: Dry Cathode, Partial Placement of Current Collectors, Multiple Through-Holes, Decrease in Surface Area of Through-Holes A cathode was prepared in substantially the same process as described in Embodiment 1, except that the proportion of the surface area occupied by through-holes in the entire surface area of one side of the cathode active material layer was decreased to 0.2%.

Preparation of Coin Cell

A coin cell was prepared by the same process as described in Embodiment 1, except that the cathode described above with respect to Embodiment 3 was utilized.

Embodiment 4: Dry Cathode, Partial Placement of Current Collectors, Multiple Through-Holes, Increase in Through-Hole Diameter A dry electrode was prepared by the same process as described in Embodiment 1, except that the diameter of the through-holes was increased to 10 μm. The ratio (d1/T1) of diameter d1 of through-hole to thickness T1 of electrode active material layer was 0.1.

Preparation of Coin Cell

A coin cell was prepared by the same process as described in Embodiment 1, except that the cathode described above with respect to Embodiment 4 was utilized.

Embodiment 5: Dry Cathode, Partial Placement of Current Collectors, Multiple Through-Holes, Decrease in Through-Hole Diameter A dry electrode was prepared by the same process as described in Embodiment 1, except that the diameter of the through-holes was decreased to 0.1 μm. The ratio (d1/T1) of diameter (d1) of through-hole to thickness (T1) of electrode active material layer was 0.001.

Preparation of Coin Cell

A coin cell was prepared by the same process as described in Embodiment 1, except that the cathode described above with respect to Embodiment 5 was utilized.

Embodiment 6: Dry Cathode, Partial Placement of Current Collectors, Multiple Through-Holes, and Square Through-Hole A dry electrode was prepared by the same process as described in Embodiment 1, except that the shape of through-hole was changed to a square shape.

Preparation of Coin Cell

A coin cell was prepared by the same process as described in Embodiment 1, except that the cathode described above with respect to Embodiment 6 was utilized.

Embodiment 7: Dry Cathode, Partial Placement of Current Collectors, Multiple Through-Holes, and Regular Hexagonal Through-Hole (Honeycomb Structure)

A dry electrode was prepared by the same process as described in Embodiment 1, except that the shape of through-hole was changed to a regular hexagonal shape.

Preparation of Coin Cell

A coin cell was prepared in substantially the same process as described in Embodiment 1, except that the cathode described above with respect to Embodiment 7 was utilized.

Comparative Example 1: Dry Cathode, Placement of All Current Collectors, and No Through-Holes A dry cathode was prepared in substantially the same process as described in Embodiment 1, except no through-holes were introduced into the cathode active material layer and the method used a cathode current collector of the same size as a cathode active material layer self-standing film, and a laminate body was prepared by placing the cathode current collector on the entire surface on top of a first cathode active material layer self-standing film, and placing a second cathode active material layer self-standing film on the cathode current collector (e.g., on the opposite side of the cathode current collector).

The prepared dry electrode had a cross-sectional structure as illustrated in FIG. 3A.

Preparation of Coin Cell

A coin cell was prepared in substantially the same process as described in Embodiment 1, except that the cathode described above with respect to Comparative Example 1 was utilized.

Comparative Example 2: Dry Cathode, Partial Placement of Current Collectors, and No Through-Holes A dry cathode was prepared in substantially the same process as described in Embodiment 1, except that no through-holes were introduced into the cathode active material layer.

The prepared dry electrode had a cross-sectional structure as illustrated in FIG. 3B.

Preparation of Coin Cell

A coin cell was prepared in substantially the same process as described in Embodiment 1, except that the cathode described above with respect to Comparative Example 2 was utilized.

Comparative Example 3: Wet Cathode, Placement of All Current Collectors, and No Through-Holes Preparation of Cathode A mixture obtained by mixing cathode active material $LiNi_{0.91}Co_{0.05}Al_{0.04}O_2$, a carbon conductive material (Denka Black), and polyvinylidene fluoride (PVdF) in a weight ratio of 92:4:4, was mixed with N-methylpyrrolidone (NMP) in an agate mortar, to prepare a slurry.

The slurry was bar-coated on the entire one side of an aluminum current collector having a thickness of 15 μm and dried at room temperature, and then dried once again at 120° C. under vacuum, to introduce a first cathode active material layer.

Subsequently, by the same method as above, a second cathode active material layer was introduced onto the other side of the other side of the aluminum current collector, to prepare a laminate body. The prepared laminate body was rolled, to produce a cathode. The pressure for rolling was 4.0 ton/cm.

The prepared cathode had a cross-sectional structure as illustrated in FIG. 3A.

Preparation of Coin Cell

A coin cell was prepared in substantially the same process as described in Embodiment 1, except that the cathode described above with respect to Comparative Example 3 was utilized.

Comparative Example 4: Wet Cathode, Placement of All Current Collectors, and Multiple Through-Holes A cathode was prepared by the same process as described in Comparative Example 3, except that through utilizing a punch, a plurality of through-holes evenly spaced apart from one another and thus regularly and periodically disposed, were additionally created in the rolled cathode.

The diameter, direction, and/or the like, of the through-holes were identical to those of the through-holes in Embodiment 1. The through-holes were disposed passing through the cathode current collector.

The prepared cathode had a cross-sectional structure as illustrated in FIG. 3C.

Preparation of Coin Cell

A coin cell was prepared in substantially the same process as described in Embodiment 1, except that the cathode described above with respect to Comparative Example 4 was utilized.

Reference Example 1: Dry Cathode, Coating Layer-Free

A dry cathode was prepared by the same process as described in Comparative Example 2, except an aluminum thin film having a thickness of 12 μm and not coated with a carbon layer was utilized as a cathode current collector.

Because in the prepared cathode, a portion of the cathode active material layer remained separated from the cathode current collector, a coin cell could not be produced.

Evaluation Example 1: Evaluation of Stretchability

Stretchability was determined utilizing a universal testing machine for the cathodes prepared in Embodiments 1 to 7, Comparative Example 1, Comparative Example 3, and Comparative Example 4.

With both terminal ends in a length direction of a cathode fixed, the cathode was stretched in the length direction of the cathode to a distance that corresponds to 10% of the length of the cathode and then was allowed to shrink to an initial length, to determine stretchability of the cathode.

In the cathodes prepared in Embodiments 1 to 7, there were no cracks and/or the like formed in the cathode after stretching and shrinking. Accordingly, it was confirmed that the cathodes prepared in Embodiments 1 to 7 were stretchable cathodes.

In the cathodes prepared in Comparative Example 1, Comparative Example 3, and Comparative Example 4, there were cracks formed in the cathode due to cracking in the cathode current collector during the stretching process. Accordingly, it was confirmed that the cathodes in Comparative Example 1, Comparative Example 3, and Comparative Example 4 could not be stretched.

Evaluation Example 2: Evaluation of Vertical Force of Cathode Active Material Layer (I)

Using SAICAS (SAICAS EN-EX, Daipla Wintes, JAPAN), cohesion characteristics of the cathode active material layers included in the cathodes prepared in Embodiments 1 to 7 and Comparative Examples 1 to 4 were analyzed.

Analyses of cohesion characteristics were conducted on the first domain in which the cathode current collector was disposed between both sides of the cathode active material layer.

Utilizing a diamond blade having a width of 1 mm, a constant speed analysis was performed under the conditions of a clearance angle of 10 degrees, a rake angle of 20 degrees, a shearing angle of 45 degrees, a horizontal velocity of 4 $\mu$m/s, and a vertical velocity of 0.4 $\mu$m/s, to measure a vertical force ($F_v$) as a function of depth.

First, a first constant speed analysis was performed from a first location on a surface of the cathode active material layer included in a first domain to a surface of the cathode current collector, and the cathode active material layer was removed by moving the blade horizontally along the surface of the cathode current collector. Subsequently, at a location moved backwards by 10 $\mu$m from the first location, a second constant speed analysis was performed under the same conditions as the first constant speed analysis. Data measured in the second constant speed analysis were utilized.

In the cathode active material layer, a vertical force of the cathode active material layer was measured, and by normalizing the measured data to area on a cohesion force graph, a vertical relative force ($F_{VR}$) of the cathode active material layer as a function of depth was derived.

For the vertical force of the cathode active material layer, data measured in a section from a first point spaced apart by 5% from the surface of the cathode active material layer to a second point spaced apart by 5% from the surface of the electrode current collector with respect to the total thickness of the cathode active material layer, was utilized. In other words, data near the surface of the cathode active material layer and near the surface of the electrode current collector were excluded in order to prevent or reduce measurement error.

From the derived vertical relative force ($F_{VR}$) data of the cathode active material layer, a rate of change in the vertical relative force ($F_{VR}$) was calculated utilizing Equation 1. A part of the results was shown in Table 1.

$$\text{Rate of Change in Vertical Relative Force } (F_{VR}) = [(\text{Maximum Value of Vertical Relative Force} -$$

$$\text{Minimum Value of Vertical Relative Force})/ \\ \text{Minimum Value of Vertical Relative force}] \times 100 \quad \text{Equation 1}$$

TABLE 1

| | Rate of Change in Vertical Relative Force [%] |
|---|---|
| Comparative Example 3 | 1718 |
| Embodiment 1 | 276 |

As shown in Table 1, the rate of change in vertical relative force of the cathode active material layer included in the cathode of Embodiment 1 was less than 300% (300% or less).

Accordingly, it was confirmed that the cathode active material layer had a substantially uniform cohesion force and composition distribution, independent of the location in the thickness direction thereof.

On the other hand, the rate of change in force of the cathode active material layer included in the cathode of Comparative Example 3 was greater than 300%.

Accordingly, it was confirmed that the cathode active material layer had a cohesion force and composition distribution that significantly varies depending on the location in the thickness direction.

Evaluation Example 3: Evaluation of Horizontal Force of Cathode Active Material Layer (II)

Using SAICAS (SAICAS EN-EX, Daipla Wintes, JAPAN), cohesion characteristics of the cathode active material layers included in the cathodes prepared in Embodiments 1 to 7 and Comparative Examples 1 to 4 were analyzed.

Analyses of cohesion characteristics were conducted on the first domain in which the cathode current collector was disposed between both sides of the cathode active material layer.

Using a diamond blade having a width of 1 mm, a constant speed analysis was performed under the conditions of a clearance angle of 10 degrees, a rake angle of 20 degrees, a shear angle of 45 degrees, a horizontal velocity of 4 $\mu$m/s, and a vertical velocity of 0.4 $\mu$m/s, to measure a horizontal force ($F_H$) as a function of depth.

First, a first constant speed analysis was performed from a first location on a surface of the cathode active material layer included in a first domain to a surface of the cathode current collector, and the cathode active material layer was removed by moving the blade horizontally along the surface of the cathode current collector. Subsequently, at a location moved backwards by 10 $\mu$m from the first location, a second constant speed analysis was performed under the same conditions as the first constant speed analysis. Data measured in the second constant speed analysis were utilized.

With respect to the total thickness of the cathode active material layer, a first horizontal force ($F_{H1}$) at a first point spaced apart by 10% from the surface of the cathode active material layer, and a second horizontal force ($F_{H2}$) at a second point spaced apart by 10% from the surface of the cathode current collector, were measured.

A part of the evaluation results of horizontal force was shown in Table 2. The ratio of horizontal force between the second point and the first point is defined by Equation 2.

$$\text{Ratio of Horizontal Forces between Second Point} \\ \text{and First Point } (\%) = [F_{H2}/F_{H1}] \times 100 \quad \text{Equation 2}$$

TABLE 2

| | Ratio of Horizontal Relative Force [%] |
|---|---|
| Comparative Example 3 | 45 |
| Embodiment 1 | 75 |

As can be seen in Table 2 above, the cathode active material layer of Embodiment 1 had an increased horizontal force ratio, compared to the cathode active material layer of Comparative Example 3.

As a result, it was confirmed that compared to the cathode active material layer of Comparative Example 3, the cathode active material layer of Embodiment 1 had a more substantially uniform cohesion force and composition distribution.

Evaluation Example 4: Evaluation of Charging/Discharging Characteristics at Room Temperature The lithium batteries prepared in Embodiments 1 to 7 and Comparative Examples 1 to 4 were charged at 25° C. at a constant current rate of 0.1 C until a voltage of 4.4 V (vs. Li) was reached, and then was cut-off at a current rate of 0.05 C while maintaining 4.4 V in a constant voltage mode. Subsequently, the lithium batteries were discharged at a constant current rate of 0.1 C until a voltage of 2.8 V (vs. Li) was reached during discharging (formation cycle).

The lithium batteries after the formation cycle were charged at 25° C. at a constant current rate of 0.5 C until a voltage of 4.4 V (vs. Li) was reached. Subsequently, the lithium batteries were discharged at a constant current rate of 0.5 C until a voltage of 2.8 V (vs. Li) was reached during discharging, and were subject to the same cycle as described above up to the 100th cycle under the same conditions (repeated 100 times).

In all charge/discharge cycles, 10 minutes of rest time was provided after each charge/discharge cycle. A part of the room-temperature charge/discharge test results is shown in Table 3. Capacity retention rate at the 100th cycle is defined by Equation 1.

$$\text{Capacity Retention Rate [\%]} = [\text{Discharge Capacity at } 100^{th} \text{ Cycle/Discharge Capacity at } 1^{st} \text{ Cycle}] \times 100 \qquad \text{Equation 1}$$

TABLE 3

| | Electrode type or kind | Current collector placement | Presence/ shape of through-holes | d1 (Through-hole diameter, μm) | A1 (Through-hole area, %) | d1/T1 (Through-hole diameter/ Electrode thickness) | Capacity retention rate [%] |
|---|---|---|---|---|---|---|---|
| Example 1 | Dry type or kind | Partial | Present/o | 1 | 1 | 1/100 | 89 |
| Example 2 | Dry type or kind | Partial | Present/o | 1 | 5 | 1/100 | 91 |
| Example 3 | Dry type or kind | Partial | Present/o | 1 | 0.2 | 1/100 | 88 |
| Example 4 | Dry type or kind | Partial | Present/o | 10 | 1 | 10/100 | 90 |
| Example 5 | Dry type or kind | Partial | Present/o | 0.1 | 1 | 0.1/100 | 88 |
| Example 6 | Dry type or kind | Partial | Present/□ | 1 | 1 | 1/100 | 89 |
| Example 7 | Dry type or kind | Partial | Present/ hexagonal | 1 | 1 | 1/100 | 89 |
| Comparative Example 1 | Dry type or kind | Total | Absent | — | — | — | 87 |
| Comparative Example 2 | Dry type or kind | Partial | Absent | — | — | — | 87 |
| Comparative Example 3 | Wet type or kind | Total | Absent | — | — | — | 86 |
| Comparative Example 4 | Wet type or kind | Total | Present/o | 1 | 1 | 1/100 | 87 |

As can be seen in Table 3 above, the lithium batteries of Embodiments 1 to 7 have improved room-temperature lifetime characteristics, compared to the lithium batteries of Comparative Examples 1 to 4.

Evaluation Example 5: Evaluation of High Rate Capability at Room Temperature

The lithium batteries prepared in Embodiments 1 to 7 and Comparative Examples 1 to 4 were charged at 25° C. at a constant current rate of 0.1 C until a voltage of 4.4 V (vs. Li) was reached, and then was cut-off at a current rate of 0.05 C while maintaining 4.4 V in a constant voltage mode. Subsequently, the lithium batteries were discharged at a constant current rate of 0.1 C until a voltage of 2.8 V (vs. Li) was reached during discharging (formation cycle).

The lithium batteries after the formation cycle were charged at 25° C. at a constant current rate of 0.2 C until a voltage of 4.4 V (vs. Li) was reached. Subsequently, the lithium batteries were discharged at a constant current rate of 0.2 C until a voltage of 2.8 V (vs. Li) was reached during discharging (1st cycle).

The lithium batteries after the 1st cycle were charged at 25° C. at a constant current rate of 0.2 C until a voltage of 4.4 V (vs. Li) was reached. Subsequently, the lithium batteries were discharged at a constant current rate of 0.33 C until a voltage of 2.8 V (vs. Li) was reached during discharging (2nd cycle).

The lithium batteries after the 2nd cycle were charged at 25° C. at a constant current rate of 0.2 C until a voltage of 4.4 V (vs. Li) was reached. Subsequently, the lithium batteries were discharged at a constant current rate of 0.5 C until a voltage of 2.8 V (vs. Li) was reached during discharging (3rd cycle).

The lithium batteries after the 3rd cycle were charged at 25° C. at a constant current rate of 0.2 C until a voltage of 4.4 V (vs. Li) was reached. Subsequently, the lithium batteries were discharged at a constant current rate of 1.0 C until a voltage of 2.8 V (vs. Li) was reached during discharging (4th cycle).

The lithium batteries after the 4th cycle were charged at 25° C. at a constant current rate of 0.2 C until a voltage of 4.4 V (vs. Li) was reached. Subsequently, the lithium batteries were discharged at a constant current rate of 2.0 C until a voltage of 2.8 V (vs. Li) was reached during discharging (5th cycle).

The lithium batteries after the 5th cycle were charged at 25° C. at a constant current rate of 0.2 C until a voltage of 4.4 V (vs. Li) was reached. Subsequently, the lithium batteries were discharged at a constant current rate of 3.0 C until a voltage of 2.8 V (vs. Li) was reached during discharging (6th cycle).

Throughout all of the charge/discharge cycles, 10 minutes of rest time was provided after each charge/discharge cycle. A part of results of the room-temperature charge/discharge test is shown in Table 4. High rate capability is defined by Equation 2.

$$\text{High Rate Capability [\%]} = [\text{Discharge Capacity at } 5^{th} \text{ Cycle/Discharge Capacity at } 1^{st} \text{ Cycle}] \times 100 \qquad \text{Equation 2}$$

TABLE 4

| | Electrode Type | Current collector placement | Presence/ shape of through-hole | d1 (Through-hole diameter, μm) | A1 (Through-hole area, %) | d1/T1 (Through-hole diameter/ Electrode thickness) | High Rate Capability Characteristics (2 C/ 0.2 C) [%] |
|---|---|---|---|---|---|---|---|
| Example 1 | Dry type or kind | Partial | Present/o | 1 | 1 | 1/100 | 83 |
| Example 2 | Dry type or kind | Partial | Present/o | 1 | 5 | 1/100 | 83 |
| Example 3 | Dry type or kind | Partial | Present/o | 1 | 0.2 | 1/100 | 81 |
| Example 4 | Dry type or kind | Partial | Present/o | 10 | 1 | 10/100 | 83 |
| Example 5 | Dry type or kind | Partial | Present/o | 0.1 | 1 | 0.1/100 | 81 |
| Example 6 | Dry type or kind | Partial | Present/□ | 1 | 1 | 1/100 | 82 |
| Example 7 | Dry type or kind | Partial | Present/ Hexagonal | 1 | 1 | 1/100 | 82 |
| Comparative Example 1 | Dry type or kind | Total | Absent | — | — | — | 80 |

TABLE 4-continued

| Electrode Type | Current collector place-ment | Presence/ shape of through-hole | d1 (Through-hole diameter, μm) | A1 (Through-hole area, %) | d1/T1 (Through-hole diameter/ Electrode thickness) | High Rate Capability Charac-teristics (2 C/ 0.2 C) [%] |
|---|---|---|---|---|---|---|
| Compar-ative Example 2 | Dry type or kind | Partial | Absent | — | — | — | 80 |
| Compar-ative Example 3 | Wet type or kind | Total | Absent | — | — | — | 40 |
| Compar-ative Example 4 | Wet type or kind | Total | Present/o | 1 | 1 | 1/100 | 41 |

As can be seen in Table 4 above, the lithium batteries of Embodiments 1 to 7 have improved high rate capability compared to the lithium batteries of Comparative Examples 1 to 4.

In one or more embodiments, the lithium batteries of Embodiments 1 to 7 employing a cathode including through-holes showed improved high rate capability compared to the lithium batteries of Comparative Examples 1 to 2 that do not include through-holes.

The lithium batteries of Embodiments 1 to 7, which employed a dry cathode including through-holes, show improved high rate capability compared to the lithium batteries of Comparative Examples 3 and 4, which employed a wet cathode.

According to one aspect, as an electrode current collector is positioned in a portion of the electrode active material in an electrode, flexibility of the electrode is increased, and as an electrode active material layer includes through-holes, cycle characteristics of a lithium battery employing such an electrode are improved.

In one or more embodiments, as constituent components are uniformly distributed inside an electrode, high rate capability of a lithium battery employing the electrode are improved.

The vehicle, the electronic device, and/or the battery, e.g., a battery controller, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instruc-tions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It should be understood that embodiments described herein should be considered in a descriptive sense only and not for purposes of limitation. Descriptions of features or aspects within each embodiment should typically be con-sidered as available for other similar features or aspects in other embodiments. While one or more embodiments have been described with reference to the drawings, it will be understood by those of ordinary skill in the art that changes in form and details may be made therein without departing from the spirit and scope of the disclosure as defined by the following claims and equivalents thereof.

What is claimed is:

1. An electrode, comprising:
an electrode active material layer comprising an electrode active material and a binder; and
an electrode current collector at a portion of the electrode active material layer on one side of the electrode active material layer or at a portion of the electrode active material layer between opposing sides of the electrode active material layer,
wherein the electrode active material layer has a plurality of through-holes;
wherein the electrode has:
a first domain comprising the portion of the electrode active material layer and the electrode current col-lector; and
a second domain comprising a remaining portion of the electrode active material layer and being free of the electrode current collector, and
wherein the plurality of through-holes is in the second domain and the first domain is free of any through-hole of the plurality of through-holes.

2. The electrode of claim 1, wherein the electrode active material layer comprises:
a first surface and a second surface opposing the first surface,
a first side surface and a second side surface opposing the first side surface, wherein the first side surface is connected to length-direction terminal ends of the first surface and the second surface, and a third side surface and a fourth side surface opposing the third side surface, wherein the third side surface is connected to width-direction terminal ends of the first surface and the second surface, wherein the first domain is defined by the first surface, the second surface, the third side surface, and the fourth side surface, and comprises the electrode current collector between the first surface and the second surface, and the second domain is defined by the first surface, the second surface, the third side surface, and the fourth side surface, and is free of the electrode current collector between the first surface and the second surface.

3. The electrode of claim 2, wherein the electrode active material comprises a first surface area defined by a length-direction first distance and a width-direction first distance of the electrode active material layer, and the electrode current collector has a second surface area defined by a length-direction second distance and a width-direction second distance of the electrode current collector, wherein the second surface area of the electrode current collector is 50% or less of the first surface area of the electrode active material layer.

4. The electrode of claim 2, wherein a length-direction second distance of the electrode current collector is 50% or less of a length-direction first distance of the electrode active material layer, or a width-direction second distance of the electrode current collector is 50% or less of a width-direction first distance of the electrode active material layer.

5. The electrode of claim 1, wherein the electrode is a stretchable electrode, wherein the stretchable electrode is stretchable in at least one direction of a length direction or a width direction of the stretchable electrode.

6. The electrode of claim 1, wherein one side of the electrode comprises a first surface in which the plurality of through-holes is arranged, wherein a surface area of the first surface is 99% or less than a total surface area of the electrode.

7. The electrode of claim 1, wherein a ratio (d1/T1) of an average diameter (d1) of the plurality of through-holes to a thickness (T1) of the electrode active material layer is 0.001 to 0.1.

8. The electrode of claim 1, wherein through-holes of the plurality of through-holes are regularly and periodically spaced apart in a uniform interval in the electrode active material layer, and comprise a lattice structure.

9. The electrode of claim 1, wherein an opening of each of the plurality of through-holes has at least one of a circular shape, an oval shape, a triangle shape, a rectangular shape, a pentagonal shape, a hexagonal shape, an alphabet shape, or a donut shape, each of the plurality of through-holes comprises an angle of 60 degrees to 120 degrees with the one side or the opposing sides of the electrode active material layer, and the electrode comprises a structure in which the electrode active material layer is alternatively arranged with the through-holes in a cross-sectional view.

10. The electrode of claim 1, wherein the electrode active material layer further comprises an interlayer between the electrode active material layer and the electrode current collector, wherein a thickness of the interlayer is 30% or less of a thickness of the electrode current collector.

11. The electrode of claim 10, wherein the interlayer comprises a second binder, wherein the second binder is at least one of a conductive binder or a non-conductive binder, and the binder is also a fluorine-based binder.

12. The electrode of claim 10, wherein the interlayer further comprises a carbon-based conductive material.

13. The electrode of claim 1, wherein the binder is a dry binder, wherein the dry binder comprises a fibrillized binder, and the dry binder comprises a fluorine-based binder.

14. The electrode of claim 1, wherein the electrode active material layer further comprises a conductive material, wherein the conductive material is a dry conductive material, wherein the dry conductive material comprises a carbon-based conductive material.

15. The electrode of claim 1, wherein the electrode active material layer is a self-standing film, and the electrode active material layer is free of residual processing solvent.

16. The electrode of claim 1, wherein a change rate of a vertical relative force (FVR) as a function of depth, of the electrode active material layer, from a first point to a second point, is 300% or less, when measured by a surface and interfacial cutting analysis system (SAICAS), wherein with respect to a total thickness of the electrode active material layer, the first point is spaced apart by 5% from a surface of the electrode active material layer in a direction of the electrode current collector and the second point is spaced apart by 5% from a surface of the electrode current collector.

17. The electrode of claim 1, wherein a horizontal force ratio of a second horizontal force ($F_{H2}$) at a second point to a first horizontal force ($F_{H1}$) at a first point in the electrode active material layer is 50% or more, when measured by a surface and interfacial cutting analysis system (SAICAS), wherein, with respect to a total thickness of the electrode active material layer, the first point is spaced apart by 10% from a surface of the electrode active material layer in a direction of the electrode current collector and the second point is spaced apart by 10% from a surface of the electrode current collector.

18. A lithium battery, comprising:

a cathode;

an anode; and an electrolyte between the cathode and the anode, wherein at least one of the cathode or the anode is the electrode according to claim 1.

19. A method of preparing an electrode, the method comprising:

preparing a mixture by dry mixing a dry electrode active material, a dry conductive material, and a dry binder;

providing an electrode current collector;

preparing the electrode comprising an electrode active material layer and a binder on one side or opposite sides of the electrode current collector, by placing and rolling the mixture on the one side or the opposite sides of the electrode current collector; and introducing a plurality of through-holes into the electrode active material layer, wherein the introduction of the plurality of through-holes is carried out at the same time as the rolling, or subsequent to the rolling;

wherein the electrode current collector is at a portion of the electrode active material layer on one side of the electrode active material layer or at a portion of the electrode active material layer between opposing sides of the electrode active material layer;

wherein the electrode has:

a first domain comprising the portion of the electrode active material layer and the electrode current collector; and a second domain comprising a remaining portion of the electrode active material layer and being free of the electrode current collector, and wherein the plurality of through-holes is in the second domain and the first domain is free of any through-hole of the plurality of through-holes.

* * * * *